(12) United States Patent
Shu et al.

(10) Patent No.: US 12,114,075 B1
(45) Date of Patent: Oct. 8, 2024

(54) OBJECT SELECTION IN COMPUTER VISION

(71) Applicant: Amazon Technologies, Inc., Seattle, WA (US)

(72) Inventors: Yu Shu, Foster City, CA (US); Yahia Chafik Chehadeh, Palo Alto, CA (US); Heliben Dhrumil Desai, San Jose, CA (US); Young Sun Kim, Dublin, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/218,199

(22) Filed: Jul. 5, 2023

Related U.S. Application Data

(63) Continuation of application No. 17/089,322, filed on Nov. 4, 2020, now Pat. No. 11,743,588.

(60) Provisional application No. 63/081,422, filed on Sep. 22, 2020.

(51) Int. Cl.
| | |
|---|---|
| *H04N 23/695* | (2023.01) |
| *G06V 40/10* | (2022.01) |
| *H04N 7/14* | (2006.01) |
| *G10L 15/22* | (2006.01) |

(52) U.S. Cl.
CPC .......... *H04N 23/695* (2023.01); *G06V 40/10* (2022.01); *H04N 7/141* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2014/0185875 A1* | 7/2014 | Tsuji | H04N 23/611 382/103 |
| 2022/0180535 A1* | 6/2022 | Lu | G06V 10/82 |

OTHER PUBLICATIONS

Hwang et al.; Under the hood: Portal's Smart Camera; Facebook AI; Feb. 15, 2019; 11 pgs; Downloaded from https://ai.facebook.com/blog/under-the-hood-portals-smart-camera/ on Oct. 30, 2020.

* cited by examiner

*Primary Examiner* — Heather R Jones
(74) *Attorney, Agent, or Firm* — K&L Gates LLP

(57) ABSTRACT

Devices and techniques are generally described for selection of an object to follow during a video call. In various examples, a first frame of image data may be received from a camera. First image data representing a first person and second image data representing a second person may be determined. A first priority level may be determined for the first person at a first time. A second priority level for the second person may be determined at the first time. The camera may be controlled to follow the first person based at least in part on the first priority level and the second priority level.

20 Claims, 12 Drawing Sheets

Three Level Case: isFollowing, isEngaged, isSeen

Input config for the priority algorithm:

Weight Threshold: 0, 100, 1000, 2000

Weight parameters:

| Index | Event | WT | Ws (/s) | We (/s) | Note |
|---|---|---|---|---|---|
| 0 | isFollowing | 2000 | 20000 | -100 | Increase to target weight in 1/10 seconds, remove in 20s when the object/person disappears |
| 1 | isEngaged | 1000 | 200 | -200 | 5 seconds to engage and 5 seconds to disengage providing normal conversation when multiple people are talking/facing the screen |
| 2 | isSeen | 100 | 20 | -50 | 5 seconds to include in following, preventing fast moving objects from being tracked (e.g., kids running in front of camera), 2 seconds to disregard |

402 ↗ (row 0)
404 ↗ (row 1)
406 ↗ (row 2)

FIG. 4

| Index | Event | WT | Ws (/s) | We (/s) | Note |
|---|---|---|---|---|---|
| 0 | isFollowing | 6000 | 60000 | -300 | Increase to target weight in 1/10 seconds (immediately), remove in 20s when the entity disappears from the FoV |
| 1 | isEngaged && isSpeaking | 3000 | 30000 | -300 | Immediately start following, 10 seconds to disregard |
| 2 | isEngaged | 1500 | 300 | -300 | 5 seconds to engage and 5 seconds to disengage |
| 3 | isSpeaking | 1500 | 750 | -150 | 2 seconds to follow, and 10 seconds to disregard |
| 4 | isSeen | 100 | 20 | -50 | 5 seconds to follow and 2 seconds to disregard |

FIG. 6

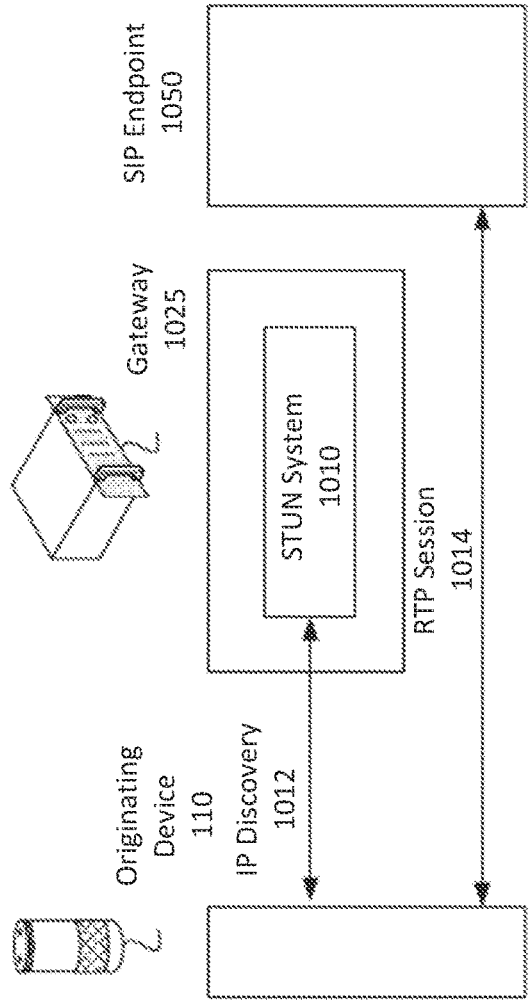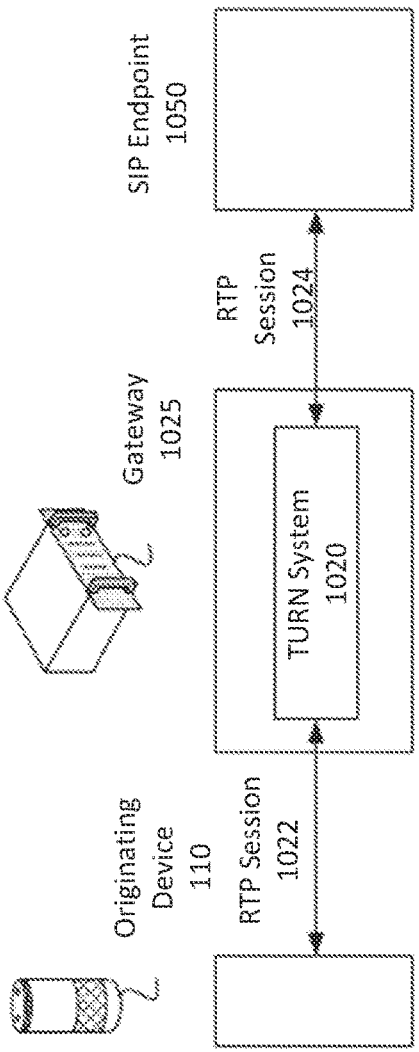

OBJECT SELECTION IN COMPUTER VISION

CROSS-REFERENCE TO RELATED APPLICATIONS

This application is a continuation of and claims priority to U.S. patent application Ser. No. 17/089,322, filed Nov. 4, 2020, now U.S. Pat. No. 11,743,588 which claims the benefit of U.S. Provisional Application No. 63/081,422, filed Sep. 22, 2020. The disclosure of each of the foregoing applications is incorporated herein by reference in its entirety.

BACKGROUND

Computer vision is a field of artificial intelligence that enables computers to perceive and understand visual input. Machine learning computer vision models can allow computers to detect and classify objects appearing in image data and video data. Upon classification of a particular object, computers can react to the particular object in defined ways. In various examples, computer vision can be used for event detection, object classification, pose estimation, motion detection/estimation, 3D modeling, image restoration, scene reconstruction, etc.

BRIEF DESCRIPTION OF DRAWINGS

FIG. 4 is a table depicting an example of weight calculation of three properties for a single object, according to various embodiments of the present disclosure.

FIG. 6 is a table depicting an example of weight calculation for five properties for a single object, according to an embodiment of the present disclosure.

FIGS. 10A-10B illustrate examples of establishing media connections between devices according to embodiments of the present disclosure.

DETAILED DESCRIPTION

Figure 1:
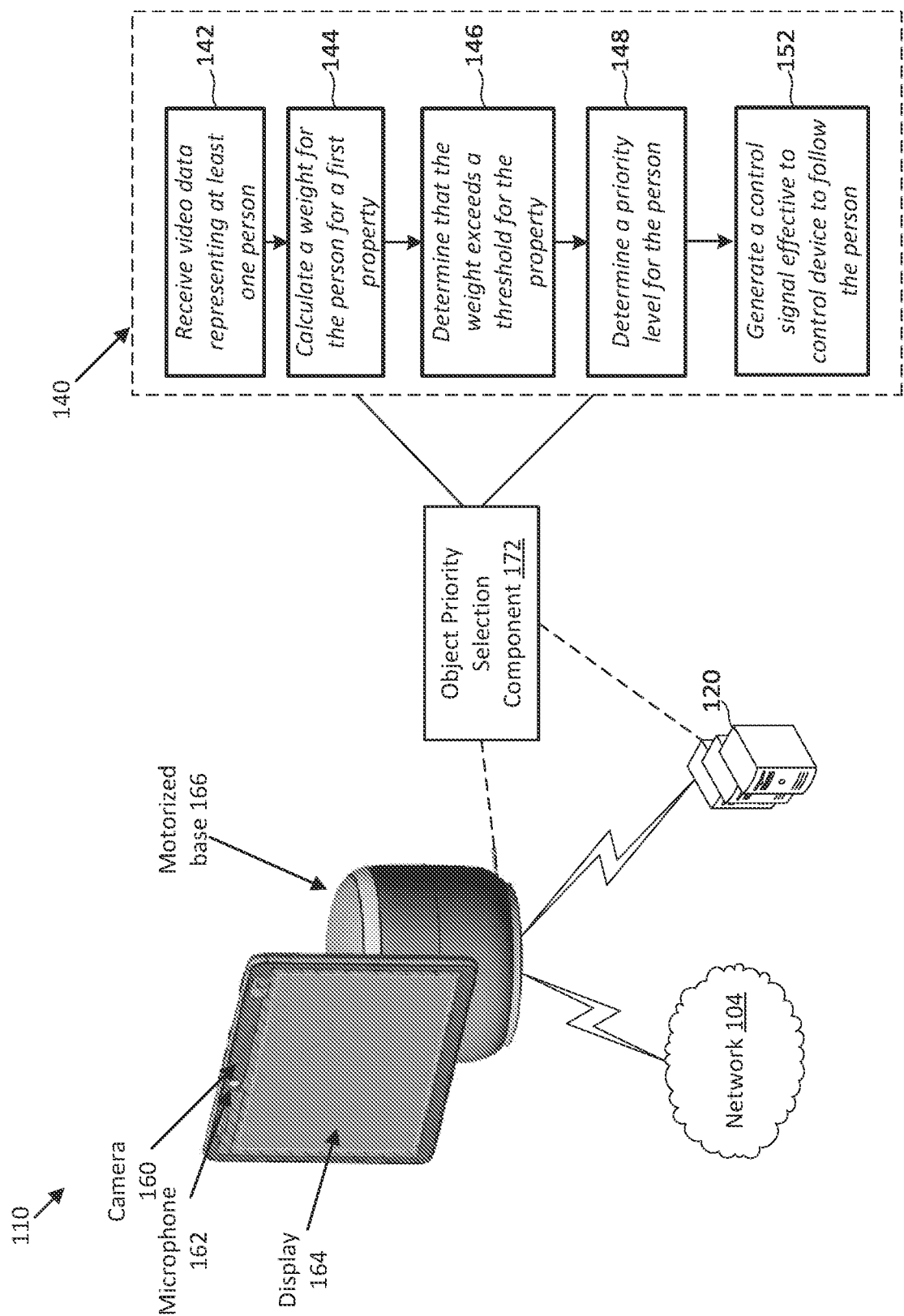
FIG. 1 is a diagram illustrating an example device that may be effective to detect and follow selected objects during video calls, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, computing devices are described comprising embedded camera systems and/or displays. In various examples, the camera system and/or the displays of some of the computing devices described herein may be motorized such that the camera system and/or display may be movable and may face different directions. For example, the device may rotate along one or more axes such that the field-of-view (FoV) of the camera system may capture images from different directions. In one example, the device may rotate horizontally (e.g., along an axis parallel to the floor) 360° such that images and/or video may be captured of any direction along the horizontal axis. In various other examples, the device may rotate along the vertical and horizontal axes such that the camera system has a spherical FoV.

In various examples, the computing devices may be effective to communicate (e.g., over a network such as the Internet and/or a local area network (LAN)) with one or more other devices. For example, the devices may communicate using a real time communication protocol such as WebRTC to enable video and/or image data to be sent from the devices to one or more other devices. Similarly, the devices may receive video and/or images from other devices and may display such video/images on a display of the devices.

In various examples, the devices may include one or more processors and/or non-transitory computer-readable memory. The non-transitory computer-readable memory may store instructions that enable the device to perform various functions including communication using WebRTC and/or other communication protocols. In some examples, the devices may be effective to engage in audio and/or video communication with other devices, sometimes referred to as "video chat" and/or "video calls." Additionally, the devices may engage in voice over IP and/or audio calls with one or more other devices (e.g., mobile phones and/or other computing devices).

In various examples, during a video call, the device may be effective to track a local participant in the video call as the person moves around a room in which the device is located. For example, the device may pan (using a motor of the device and/or by digitally panning within a captured frame of image data that has a larger size relative to an image that is displayed on the display) so that the displayed image and/or the FoV of the camera system remains centered around an engaged participant(s) in the video call. Additionally, the device may be effective to zoom in on the participant and/or zoom out to retain a wider-angle FoV. Various techniques described herein are configured to detect and prioritize objects (e.g., participants) during a video call and/or during other video-based communication (e.g., video games, etc.). Prioritized objects may be those persons, things, and/or animals that are selected at a given time for following (e.g., by controlling a motor of the device to maintain the object within the FoV of the camera and/or by using a Digital Pan, Tilt, Zoom (DPTZ) operation to frame the object within an output frame of image data generated from a wider-angle frame of image data captured by the camera). As described herein, priorities for objects may be continually calculated during a video call (or other video-based communication) such that different participants may attain different priorities during a given session. In various examples, this may result in a natural viewer experience where the viewer of a video call (e.g., the callee) may see the person that is currently the most engaged (based on an engagement property determined using CV, for example) and/or has otherwise been designated as the person to be followed during the video call session.

FIG. 1 is a diagram illustrating an example device 110 that may be effective to detect and follow selected objects during video calls, in accordance with various aspects of the present disclosure. As shown, the device may include at least one display 164, at least one camera 160, at least one microphone 162, and a motorized base 166. In the example depicted in FIG. 1, the motorized base 166 may be configured to rotate 360°, 270°, and/or any other desired amount of rotation along a single axis. However, in various other implementations the device may rotate by any desired amount along any number of axes. As described herein, the motorized base 166 may be effective to move the device 110 so that a person interacting with the device 110 (e.g., during a video call) may be able to see the display 164 and so that the person remains in the FoV of the camera 160. This may allow improved video call experiences, as the user need not remain stationary during the video call. In various examples, the display portion of the device 110 (which may also include the at least camera 160 in some examples) may be manually positioned by a user in addition to be controlled by one or more internal motors for device-controlled movement.

In various examples, the device 110 may be controllable using a voice interface (e.g., a natural language processing system 120). In some examples, natural language processing (e.g., speech processing and/or text processing) may occur wholly or partially on device 110. In some other examples, natural language processing may be performed by a natural language processing system 120 that may be configured in communication with device 110 over a network 104 (e.g., a local area network (LAN) and/or wide area network (WAN), such as the Internet). Various natural language processing architectures are described below in reference to FIGS. 2 and 8.

In various examples, users of device 110 may issue spoken commands such as "Follow me," "Zoom in on my face," etc., during video calls in order to control the behavior of the device. Additionally, voice commands may be used to initiate and/or end video calls (and/or audio calls) and may be used to perform other functionality associated with the device 110 (e.g., video playback, audio playback, Internet browser control, application control, etc.). In various examples, the device 110 may be effective to determine that a user is interacting with the device and use the motor of the device 110 to face the device's display 164 toward the user. For example, a user may say a wakeword configured to initiate communication with a voice interface of the device 110. The device 110 may use various techniques (e.g., beamforming) to determine a direction from which the wakeword was received and may rotate the display 164 and/or camera 160 to face that direction. In various other examples, a user may initiate a video call with the device 110. In such examples, priority selection techniques performed by object priority selection component 172 may be used to frame an individual(s) interacting with the device during the video call. The object priority selection component 172 may control motorized base 166 and/or camera 160 to center a prioritized person within frames of image data captured and/or generated by the device 110.

In some examples, the device 110 may use a combination of computer vision techniques and/or audio processing techniques to determine the presence, location, and/or level of engagement of individuals interacting with the device. In various examples, all processing to determine the presence and/or location of individuals interacting with the device 110 may be performed locally on the device 110 to avoid sending potentially sensitive data to any remote devices. In various examples, the camera 160 of the device 110 may be controlled to digitally pan and/or zoom to frame individuals interacting with the device 110 to keep such individuals visible within the FoV and/or centered within the image frames generated by the device and sent to remote "callee" devices during a video call.

In some examples, during video calls the device 110 may default to a wide angle FoV. Individual participants in the video call may be selected by object priority selection component 172 based on the various object selection priority techniques described herein. In various examples, those individuals with the highest priority (e.g., those individuals that have been determined to be interacting with the device during the video call) may be prioritized for following by the device's camera. In this context, following a person and/or object may comprise digitally panning, zooming, and/or physically moving the camera 160 (e.g., using motorized base 166) to maintain a location of the person and/or object within the frame of image data, even when the person and/or object is moving from place to place within the physical environment. Accordingly, a user interacting with the device 110 during a video call need not concern themselves with staying within the camera 160's FoV as the camera 160 may pan and/or the device 110 may rotate using the motorized base 166 to maintain the user within the image frames generated and sent to other participants in the video call.

Additionally, user's that are within the FoV, but who are not interacting with the device 110 (e.g., individuals who are not participating in the video call) may be prioritized at a lower level relative to individuals who are actively engaged with the device using the object selection and prioritization techniques described herein. As such, the camera 160 may continue to frame more highly-prioritized individuals even when the lower-priority individuals leave the frame. Such techniques result in a more natural user experience and avoid unwanted user experiences, such as where a camera would otherwise continually pan left and right to follow any individual entering and/or leaving the frame.

In various examples, object detectors are machine learning models that locate and/or classify objects detected in frames of image data. Typically, the output of an object detector model is a "region of interest" identifying a group of pixels and a label classifying that region of interest as belonging to a particular class for which the object detector has been trained. Bounding boxes (e.g., data indicating a perimeter surrounding a detected object within a frame of image data) are one example of a region of interest. For example, an object detector may be trained to classify dogs and cats. Accordingly, if an input image includes first pixels representing a dog and second pixels representing a cat, the object detector may output two regions of interest (e.g., output bounding box data). The first region of interest may surround the first pixels and may be labeled as "dog." Similarly, the second region of interest may surround the second pixels and may be labeled as "cat." Regions of interest may be defined using any shape. However, bounding boxes are typically rectangular and may be defined by the four pixels addresses that correspond to the corners of the bounding box. In some examples, regions of interest are defined by a perimeter of pixels surrounding pixels predicted to correspond to some object (e.g., a person, animal, thing, etc.) which the object detector has been trained to detect. In some other examples, pixel-wise and/or pixel block-wise segmentation may be used to identify regions of interest. In various examples, the device 110 may include one or more object detectors that are effective to detect and/or classify various different objects (e.g., humans, cats, dogs, faces, etc.). In some examples, dedicated artificial intelligence hardware may be used to perform computer vision tasks, such as object detection. For example, the neural network accelerator architecture described below in reference to FIG. 7 may be used to perform computer vision tasks, audio processing tasks, and/or other machine learning tasks in order to detect objects in image data and/or audio data, and/or to determine object priority for following such objects during video communication.

For example, an object detector may be effective to recognize an object (e.g., a person, thing, or animal) and/or to distinguish between different objects using face recognition algorithms. In some examples, the machine learning models used to implement object detectors may be executed locally on the device 110, while in other examples, the machine learning models may be executed by a back-end system (e.g., a remote computing device) with which the local devices may communicate over network 104.

Automatic speech recognition (ASR), as described herein, is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (referred to herein as a "skill") to perform an action. Generally, semantic intent data may represent a goal of a user in making the particular utterance. In some examples, the semantic intent data may include executable commands or other type of instructions that may be used to take some action related to the speech processing system's understanding of the user's request. Thereafter one or more of the semantic intents may be selected for further processing and/or output by the NLU system. For example, the semantic intent associated with the highest confidence score among the different semantic intents generated may be selected for further processing and/or output.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system.

Intent data may be used by a skill to perform an action (e.g., to generate action data and/or other skill output that may be processed in order to take some corresponding action such as answering a user's question, playing video, playing audio, etc.). In various examples described herein, a user may request that the device 110 follow the user (e.g., using the spoken request "Focus on me," "Camera focus on me," "Computer, zoom on me," etc.). NLU processing may be used to determine that the user wants the camera of the device to follow the user during a communication session (e.g., a video call). Accordingly, as described in further detail below, object priority selection component 172 may prioritize the user and may control camera 160 and/or motorized base 166 to follow the user during the communication session.

Natural language inputs may refer to any data related to an input request to a speech processing system (e.g., including the various data forms described above, as each of the aforementioned data types relate to an input request to the speech processing system). In general, as used herein, skills may be any software (and/or combination of software and hardware) used during speech processing to take an action in response to input request data (e.g., natural language inputs such as user utterances and/or text).

In various examples, speech processing systems may determine an intent for particular natural language input according to an interpretation of the natural language input determined by NLU. In various examples, multiple NLU process flows may be executed for a given natural language input, as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph, which, in turn, may be used to relate different objects and/or attributes of those entities (data describing characteristics of the entities) to one another.

In various examples, NLU systems and/or components described herein may be multi-modal as the NLU systems may be effective to process other types of inputs besides input natural language data (e.g., text and/or speech). For example, multi-modal NLU systems may be effective to process image data and/or video data to determine visual feature data that semantically represents objects included in the image data. As described in further detail below, multi-modal transformer models may be machine learned models that are effective to take both natural language data and image data as inputs in order to perform some task. In various examples described herein, multi-modal NLU systems may be effective to determine one or more objects in image/video data that are referred to in a natural language input. For example, if a user says, "Computer, focus on me," multi-modal NLU may determine that "me" refers to the individual who is speaking (e.g., whose mouth is moving) in the video captured by camera 160. In various examples, multi-modal NLU systems may be effective to take other inputs besides natural language data and image data. For example, NLU systems may be effective to receive movement data (e.g., accelerometer data, gyroscope data, haptic data, telemetry data, depth sensor data, etc.) and may determine intent data and/or select objects in image data based on such data.

In various examples, the device 110 may be effective to use Digital Pan, Tilt, Zoom (DPTZ), and/or rotation to follow and frame individuals located near the device so that the display and/or camera system of the device follow the individuals. As previously described, such operations may be performed by physically moving the camera (e.g., using one or more motors of the device such as the motorized base 166 and/or a motor of the camera 160) and/or by selecting portions of a captured frame of image data. For example, a frame of image data captured by camera 160 may be a wide angle frame which may depict (when rendered on a display) a person standing near the right side of the frame. If the person is being followed (e.g., the person is being prioritized for following by object priority selection component 172), a new frame of image data may be generated that excludes some of the left-hand portion of the wide angle frame captured by the camera so that the person is more centered within the new frame.

Additionally, the display 164 may be rotated by motorized base 166 to face toward a person(s) being followed (as determined by object priority selection component 172). This may make it easier for the person(s) to see the display and/or interact with the camera system of the device. In various examples, the device 110 may comprise SmartMotionClient (SMC) software that may store entity information about the object (person) in the environment and accept client commands to follow (or not follow) the specified person. In at least some examples, the SMC software may be a component of object priority selection component 172.

This patent application describes a device 110 with improved visual, display, and audio characteristics. In some instances, the device 110 may include a display 164 that presents content. The display 164 may be hingedly coupled to a housing of the device 110 to tilt at varying degrees. Additionally, the device 110 may include a motor residing within the housing (e.g., motorized base 166) which may be effective to rotate the display 164. One or more loudspeakers (not shown in FIG. 1) may reside within the housing and may be arranged to output sound in different directions relative to the device 110.

In some instances, the device 110 may include separate sub-assemblies that when assembled, form the device 110. For example, the device 110 may include a display sub assembly and a housing sub assembly. The display sub assembly and the housing sub assembly may operably couple to one another via a hinge or other member cable of being pivoted to tilt the display at varying degrees. In some instances, the hinge may be moveable over a range of positions, such as between zero and forty degrees of tilt. In some instances, a user may grasp the display to tilt the display at varying degrees. Additionally, or alternatively, one or more actuators may tilt the display at varying degrees.

The display sub assembly may include the display 164, a camera 160 (or imaging device), microphones 162, and one or more buttons. The display 164 may present content to the user, and in some instances, may be touch sensitive and capable sensing touch input from the user. The camera 160 may capture images or video within an environment in which the device 110 resides. In some instances, a camera shutter may be slid over the camera, or otherwise obstruct the camera, from capturing images and/or videos of the environment.

The microphones 162, meanwhile, may capture user speech, user commands, and so forth. In some instances, the microphones 162 may be oriented in patterns and corresponding audio signals generated by the microphones may be used to determine a direction of speech input. For example, beamforming, time of arrival (ToA), triangulation, and/or other techniques may be used to determine the direction of speech input. In various examples, upon determining that a wakeword (e.g., "Alexa") has been detected from a particular direction, the motor of the device 110 may be used to rotate the display of the device 110 such that the display faces the direction from which the wakeword was received.

In various examples and as described in further detail below, various devices 110 may include hardware effective to perform audio processing (e.g., beamforming), computer vision processing (e.g., using convolutional neural networks and/or other machine learned models), execute machine learned models, and/or perform object selection priority processing, in accordance with various aspects of the present disclosure. For example, a neural network accelerator architecture may be used to execute various machine learning processes (including computer vision processes) so that such processes may be performed with low latency on-device, without sending data to one or more remote computing devices. An example neural network accelerator architecture is described below in reference to FIG. 7.

The one or more buttons may control an operation of the device 110. The buttons may be located at the top of the device 110, such as on a top of the display 164, and may correspond to a power button, volume buttons, sync buttons, or any other type of button or control. The buttons may be mechanical (e.g., having physically movable components) and/or electronic (e.g., capacitive sensors, optical sensors, resistive sensors, or the like).

The housing sub assembly may include a housing, one or more loudspeakers, a motor, hardware that carries out an operation of the device 110 (e.g., printed circuit boards (PCBs), processor(s), controllers, power module(s), etc.), and a base. In some instances, the housing may include a cylindrically shaped housing and may provide a platform to which components of the device 110 couple, or within which components reside. For example, the one or more loudspeakers may couple to and/or be disposed within the housing. In some instances, the device 110 may include three loudspeakers. A first loudspeaker may be arranged to emit sound towards a top of the housing (or the device 110) and may include a subwoofer loudspeaker. A second loudspeaker and a third loudspeaker may be oriented to radially emit sound away from the device 110 and may include tweeter loudspeakers.

In some instances, the first loudspeaker may be offset from a central longitudinal axis of the device 110 to counterbalance a weight of the display 164. That is, the loudspeaker may be disposed closer to a back of the device 110 to counteract a weight of the display 164, which may be disposed on a front of the device 110. Moreover, the second loudspeaker and/or the third loudspeaker may be oriented downward towards a surface on which the device 110 rests, and/or oriented outward, away from the display 164. The downward and/or outward orientation of the second loudspeaker and/or the third loudspeaker may limit or prevent sound being projected into a back or rear surface of the display 164. In some instances, the placement of the loudspeakers on or about the device 110, as well as their respective type, may provide a stereo or surround-sound effect when audio is output from the loudspeakers.

The motor may provide the housing (e.g., motorized base 166), the display 164, or other portions of the device 110 with rotational movement. In some instances, the motor may include a brushless direct current (DC) motor having a rotating body and a stationary body. The housing may couple to the rotating body such that when the motor is powered the housing rotates with the rotating body. However, the base may couple to the stationary body and remain stationary as the housing rotates. This permits the base to remain secure on a surface on which the device 110 resides.

As the housing rotates the display 164 may also rotate as well. That is, the coupling of the display 164 to the housing causes the display 164 to rotate with a movement of the housing. In some instances, the motor may be configured to rotate substantially 360 degrees or substantially 180 degrees in both clockwise and counterclockwise directions. In some instances, the motor may be configured to rotate 352 degrees and in such instances, the motor may rotate 176 degrees to either side of a reference point.

In some instances, as the device 110 may have a limited degree of rotational movement and may not be configured to rotate 360 degrees, the device 110 may include a sensor that senses a position of the motor. The sensor may include an optical sensor that measures an angular displacement or position of the motor relative to a stationary portion of the device 110, such as the stationary body. An optical index, for example, may mount to the stationary portion of the motor and the sensor may mount to the rotating body of the motor. As the motor rotates, the sensor may image the optical index to determine position. The position of the motor may be used to indicate a remaining degree of rotation in clockwise and/or counterclockwise directions.

The motor may also include a passageway, or channel, extending through the motor to provide a space in which wires may route. For example, the base may include a power PCB that receives power from a wall outlet or plug in and which couple to one or more PCBs within the housing. As the housing is located on an opposing side of the motor (or coupled to the rotating body of the housing) the wires may be wrapped or configured to resist torsional or rotational movement. For example, the wires may include helical wires, the wires may include clocksprings, and/or the wires may be overmolded for increased strength.

In some instances, the device 110 may be configured to track the user as the user moves throughout the environment or relative to the device 110. For example, as the user moves about the environment, the motor may rotate the housing such that the display 164, microphones 162, camera 160, and the loudspeakers are oriented or centered on the user. In some instances, the audio captured by the microphones 162 may be analyzed to determine the direction of the user, and correspondingly, such direction may be utilized to move the housing. Additionally, or alternatively, the camera 160 may capture images and the image data may be analyzed to determine the location of the user. As such, as the user moved above the environment, the housing and the display 164 may rotate to present content on the display for the user and/or provide the user with improved audio characteristics.

In some instances, a chassis or grill may surround at least a portion of the housing, such as sides of the housing. The grill may conceal components of the device 110, such as the one or more loudspeakers, the motor, wires, PCBs, and so forth. Additionally, a top cover may be disposed over the first loudspeaker and couple to a top of the housing. The grill and the top cover may provide the device 110 with a smooth and aesthetic appearance. The grill and/or the top cover, in some instances, may include a fabric material to allow sound generated by the loudspeakers to pass therethrough. Additionally, in some instances, the grill and/or the top cover may be interchangeable to give the device 110 varying appearances.

Introduced above, the device 110 may be configured to support speech interactions with one or more users and respond to user requests. For instance, a user may verbally request the device 110 to perform a particular task, such as to play music. The one or more microphones 162 may capture sound associated with the user speech. In some examples, the user may indicate a request by prefacing the request with a predefined keyword, such as a wake word or trigger expression. The device 110 may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response (or data) back to the device 110. Upon identifying the command, the device 110 may output a response, cause actions to be performed (e.g., playing music or ordering movie tickets), or elicit feedback from the user. In some instances, content identified in this manner may be played through the display and/or the loudspeakers of the device 110. However, the device 110 may also be configured to provide the content to peripheral devices such as Bluetooth loudspeakers or other peripherals that are nearby or in wired or wireless communication with the device 110. For example, in some instances, the device 110 may be configured to play music using a home audio system.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Storage and/or use of data related to a particular person or device (e.g., contextual data, video data, audio data, and/or any personal data) may be controlled by a user using privacy controls associated with the device 110 and/or a companion application associated with the device 110. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein. Further, as previously described, various computer vision, speech processing, and/or audio processing techniques described herein may be performed locally on device 110. Advantageously, performing such processing on-device instead of sending data to a remote system for processing may be effective to retain data on the device and may help to maintain user privacy.

In various examples, a video calling (VC) application executing as part of object priority selection component 172 may decide the appropriate persons of interest to follow during a particular video call session. The object priority selection component 172 may provide the object selection query command to SMC which may then control the device to follow the selected individual. The VC application may make the decision whether to follow a single person based on several parameters, such as:
(1) is there a command to follow this specific person (either from local or remote side, by voice user interface (VUI) and/or graphical user interface (GUI))?
(2) is the person currently participating in the video call (e.g., by facing the camera, determining gaze direction, and/or talking)?
(3) is the person currently within the FoV of the device 110's camera 160?
(4) has the person recently entered and/or left the FoV of the device 110's camera 160?

When multiple people are present in the same venue where the device 110 is located, the decision as to who to follow can be exponentially more complicated relative to a single user scenario. In addition to the above-described conditions applied to each individual person, there may be additional considerations, such as:
(1) Should the device 110 follow all persons, or just a subset of the group? For example, should the device 110 zoom out to show more people in the image frame, even when each individual person may be difficult for the device 110 to recognize, or should the device 110 zoom in to frame just a few individuals that are participating in the conversation, while ignoring other individuals (e.g., by leaving them out of the image frame).
(2) Which person or group of people should be followed (using the motorized base 166 of the device 110 to maintain the person or group within the frame) if the person(s) are moving around? For example, when the device 110 is unable to frame all persons of interest (due to individuals leaving the FoV of camera 160), the object priority selection component 172 may make a decision to ignore some of the people and to focus on the rest of the people.
(3) In some examples, a user/participant may command the device (e.g., using a voice request, a graphical user interface (GUI), etc.) to focus on an individual or on a group of people and ignore others. If the focused-on people leave the FoV and/or otherwise are not available/recognized, should the device 110 continue to track the other people that are not among those specified by the command?
(4) The camera 160 may not be able to capture all users/participants where the participants are spread out. When this occurs, should the device 110 rotate back and forth to follow the spread out individuals at times when they are talking, or should a subset of the individuals be followed to minimize motorized rotation of the device 110?
(5) Should the device 110 only follow the person facing and talking to the device 110 (e.g., in a party where there are multiple people around, but only one person is talking to the device)? Alternatively, should the device 110 follow an additional person that is not looking at the device 110 (e.g., grandparents talking to parents while a child is playing in the background)?

SMC (e.g., a computer vision application executing on the device 110) may be effective identify and supply information about persons around the device 110. For example, SMC may supply information regarding a person's location, face, orientation, status of talking/not talking, status of touching the device, moving around, etc., using Computer Vision (CV). Additionally, the SMC may accept commands to direct the device 110 to follow specified target persons in a controlled way. In various examples herein, object priority selection component 172 may use such information to make an intelligent decision about who should be followed on the display screen and how to present them (e.g., zoomed in on face, wide-angle, etc.). Upon making such a decision, a command may be generated by object priority selection component 172 and sent to SMC in order to control the device 110 accordingly.

In various examples, the processing by the object priority selection component may be effective to:
(1) generate the command to select target persons in such a way that matches an intuitive human selection process (for whom to focus on) as much as possible.
(2) generate an intelligent decision based on user desires/commands and the local environment. For example, in some instances, the same command may trigger different device behavior depending on the context.
(3) be fast enough to provide quick and accurate device responsiveness.
(4) be easily configurable to be adaptive to various different scenarios.
(5) be expandable, so that SMC can provide other, different information (e.g., data indicating that an individual is speaking, gesturing, etc.), and that such information can be easily be incorporated into the system.
(6) be adaptive to accept input from multiple sources (e.g., voice interface commands, GUI commands, remote control commands, manual override, etc.).

In various examples, a weight-based priority algorithm may be used by object priority selection component 172 to determine an individual's priority level. In turn, an individual's priority level may be used to determine whether the SMC may control the camera 160 to follow the individual. As such, different priority levels may be hierarchical and some priority levels may take precedence over other priority levels for determining whether to follow an individual. Each priority level in such a hierarchy may be associated with at least one property that may be attributable each person represented in image data (e.g., by data representing the person). For example, the isSeen property may represent that a particular person/object is currently detected in a given frame of image data. Other properties may relate to user engagement with the device 110. As described in further detail below, various conditions may be used to determine user engagement. For example, eye contact with the camera 160, facing toward the camera 160, speaking while facing the camera 160, etc. In various examples, the isEngaged property may be associated with a higher priority level relative to a priority level associated with the isSeen property. Accordingly, if two people are detected within a given frame (and/or set of frames) and one person has achieved a higher priority level relative to the other person (e.g., due to one person having been determined to be "engaged," while the other person has been determined to be not "engaged") the higher priority person may be selected for tracking by the device 110.

As used herein, "controlling the camera" to follow an object refers not only to physical rotation of the device so that the followed object is within the FoV of camera 160, but also to digital panning, zooming, to appropriately frame the individual. The weight-based priority algorithm of object priority selection component 172 may be effective to calculate the priority of all objects (e.g., persons, objects, animals) as a calculated weight value, and may select the most highly-weighted objects to be followed within the frame captured by the camera 160. Weight values may be represented as data and may be compared to various thresholds in order to determine a priority level for individuals (e.g., objects) detected in the image data.

Terminology

Commands: There may be three types of commands used by SMC, that are generated by object priority selection component 172 using the various techniques described herein. These commands may be used to control the device 110 (and the camera integrated therein) to select and/or prioritize objects for following.

A first command may be the "Frame" command. The frame command may use DPTZ (and possibly rotation), to crop the image captured by camera and put the objects specified by the command within output frames of image data, such that when the output frames of image data are rendered on a display (e.g., on a video callee device) the framed objects are displayed within the output frames and are relatively centered (e.g., to within some tolerance such as +/−10% or some other suitable percentage from a center of the image frame).

A second command may be the "Follow" command. The follow command may control rotation of the camera, decide the direction in which the camera should point, select either a single object, or a position among a group of objects (e.g., a position centered among a group of individuals).

A third command may be the "Trace" command. The trace command may control which object should be remembered by Computer Vision, so that the object may be recognized again when it disappears (e.g., leaves the camera's FoV) and subsequently reappears (e.g., re-enters the camera's FoV).

In one example implementation, there may be one person in the list that will have is Tracked=true, determined by CV (e.g., the followed object). The followed object may be the single person who is presented, or may be randomly decided by CV if multiple persons are presented.

A "Property" may be the status or value related to a person, identified by CV. For example, all of the following "Is" parameters may be properties for an object. The property may be a Boolean value (true/false), a number (0.0 to 1.0), and/or staged values (0-3), etc.

The "IsFollowing" property indicates that an object is being followed by the device. There may be an explicit command for the device to follow this single object. For example, the command "Computer, focus on me" may be effective to cause object priority selection component 172 to generate the follow command to follow the individual speaking (or otherwise inputting) the command. Alternatively, the IsTracking property may be a property in which an individual is followed based on object priority selection component 172 and/or SMC having high confidence on recognizing this object. In various examples, the IsFollowing=True status is triggered by the "focus on me" command. Since this is for a single entity, SMC will focus, track, and frame this single entity.

The "IsEngaged" property may be a value approximating the engagement of an object with device 110 (e.g., during a video call). In various examples, the IsEngaged property may be a probability value (0% to 100%) indicating a determination as to how likely it is that a particular object is engaged. The probability value can be converted to a Boolean value (>50%, true, otherwise false).

The "IsSeen" property indicates that the object is in the view of the camera 160 of device 110 (e.g., within the camera's FoV) and has been identified as an object using CV (e.g., the IsSeen property may be represented using a Boolean value).

The "Entity Weight" (w) property is a number calculated by object priority selection component 172 from the priority algorithm below, for a single object based on the object's status determined by the device. In various examples, higher weights may result in a higher probability that the object is selected for following.

An "Entry Event" may be an event where the property of the object became true. For example, an entry event may be a person that begins speaking, begins facing the camera, etc.

An "Exit Event" may be an event where the property of the object become false, like a person moved out of the view, stopped talking, etc.

For the object weight calculation equation below, the "Start time" (Ts) may be the elapsed time since an entry event has happened for an object, in seconds (e.g., Current_Time −Time_Stamp, default 0).

For the entity weight calculation equation below, the "Exit time" (Te) may be the elapsed time since an exit event has happened, in seconds (e.g., Current_Time−Time_Stamp, default 0).

For the entity weight calculation equation below, the "Entry/start weight" (Ws) value may be the rate that an object's weight increases after the entry event, per second. For example, +200 for the isSeen event indicates that an object gains 200 weight every second after an isSeen event.

For the entity weight calculation equation below, the "Exit weight" (We) may be the rate that an object's weight decreases after the exit event, per second. For example, −100 for the isSeen event indicates that an object drops 100 weight every second after the object cannot be seen anymore.

For the entity weight calculation equation below, the "Entry/Start Ratio" (Rs) is a ratio used for non-Boolean properties (e.g., isEngaged, which is a probability value between 0 to 100%). Rs may be a ratio function that adjusts the Entry/Start Weight (Ws) based on a current property value. For example, when isEngaged is low, the ratio may be small, resulting in a slow increase in the weight Ws. Conversely, when isEngaged is high, the ratio may be large resulting in a quicker increase in the weight Ws. This function is generally tolerant to false positives (e.g., where object is not engaged but is marked as engaged).

For the entity weight calculation equation below, the "Exit Ratio" (Re) is a ratio used for non-Boolean properties. Re may be a ratio function that adjusts the Exit weight (We) based on the current property value. This function generally minimizes false negatives (e.g., object is engaged but marked as not engaged).

For the entity weight calculation equation below, the "Target weight" (TW) may be the threshold value to which a weight triggered by an entry event can accumulate but cannot exceed (unitless). For example, for an isEngaged event, the TW may be 1000. Accordingly, it may take five seconds for the object to accumulate the TW weight (+200*5). After that, the weight of the object will not exceed 1000 for the isEngaged property. As described below, for state properties or categorized properties (e.g., there may be different zoom levels on an object, from far, middle to close) the TW may be different for each state/category (e.g., for each zoom level).

For the entity weight calculation equation below, the "Weight Thresholds" may be a list of threshold values that categorizes objects into a different, updated priority level based on weight. An example set of weight thresholds may be [0, 1000, 2000]. Combined with the target weight, this list provides customizable and/or hierarchical priority for events. For example, if the target weight for isFollowing, isEngaged, isSeen is 2000, 1000, 100, respectively, then any object that has equal or more than 2000 weight will be selected to follow. The remaining objects will be ignored. isFollowing objects may be those objects associated with an explicit command for the device to follow the object. If there is no object with weight more than 2000, then an object with a weight between 1000 and 2000 will be selected to follow (e.g., an engaged object). isEngaged objects may objects that look at the camera and/or are speaking. If there are still no objects (above 1000 weight), then any object that is within the FoV may be selected to follow.

5. Weight Based Priority Algorithm

The formula to calculate the weight for an object is:

$$\max(0,\min(WT_i,Ts_i*Ws_i)+Te_i*We_i)w=\max/i,j,k(\max(0,\min(WT_j,Ts_j*Ws_j+R_s(v)+Te_j*We_j*R_e(v)))<WT_1|\ldots|WT_k>$$

wherein i is the index of Boolean properties (e.g., isSeen, isEngaged, isFollowing, etc.), j is the index of number properties (isEngaged), k is the index of staged properties (e.g., zoom level). This formula may be expanded to include other types of properties. The formula outputs a single digital value that represents the weight of an object which is the maximum weight generated by one property of the object.

In various examples, object priority selection component 172 may perform a process 140 to determine one or more objects to follow during a given video communication session (e.g., during a video call). Process 140 may begin at action 142, at which video data representing at least one person may be received. For example, the camera 160 may capture a wide angle field-of-view of the environment and may generate frames of image data. There may be at least one person within the FoV of camera 160. Accordingly, the captured frames may represent the persons within the FoV (e.g., one or more participants in a video call).

Processing may continue at action 144, at which a weight may be calculated for the person for a first property. For example, a first person may have the property isSeen=1 (e.g., an entry event). CV may have detected the first person in the captured frames of image data resulting in an isSeen entry event. Thereafter, for each second since the isSeen event became true, the objects weight may increase by Ws (e.g., +200) according to the weight calculation formula above. The objects weight may accumulate and may be sampled/output at any time.

Processing may continue at action 146, at which a determination may be made that the weight exceeds a threshold for the property. At action 146, the current weight for the person may be compared to a threshold for that property. In the current example, the current weight for the person (determined at action 144) may be compared to a weight threshold for the isSeen property. If the person's weight exceeds the weight threshold, the person may be associated with a particular priority level for that property. In the current example, if the weight for the person exceeds the isSeen weight threshold, the person may be associated with the priority level "Seen," as described in further detail below. For example, an updated priority level may be determined for the person (e.g., the person's priority level may be updated from "None" to "Seen," etc.).

Processing may continue at action 148, at which a priority level for the person may be determined. At action 148, the highest priority level achieved by the person may be determined. For example, the respective weight thresholds for isSeen, isEngaged, and isFollowing may be [100, 1000, 2000]. If the person has a weight (calculated using the equation above) at the current time that is 1300, the person may be determined to be engaged. If this is the highest priority level among all objects currently detected using CV, the person may be followed by device 110 (e.g., DPTZ and/or rotation of the device 110 may be used to track the person). If there are multiple individuals at the highest achieved priority level, all individuals at the highest priority level may be followed. For example, all individuals at the highest priority level that are within the FoV may be framed by SMC using device 110's rotation and/or DPTZ.

Processing may continue at action 152 at which a control signal effective to control device 110 to follow the person may be generated and sent to SMC. The control signal may be used by SMC to control the device 110 to follow the person until priority levels change or the video call session is terminated.

Figure 2:
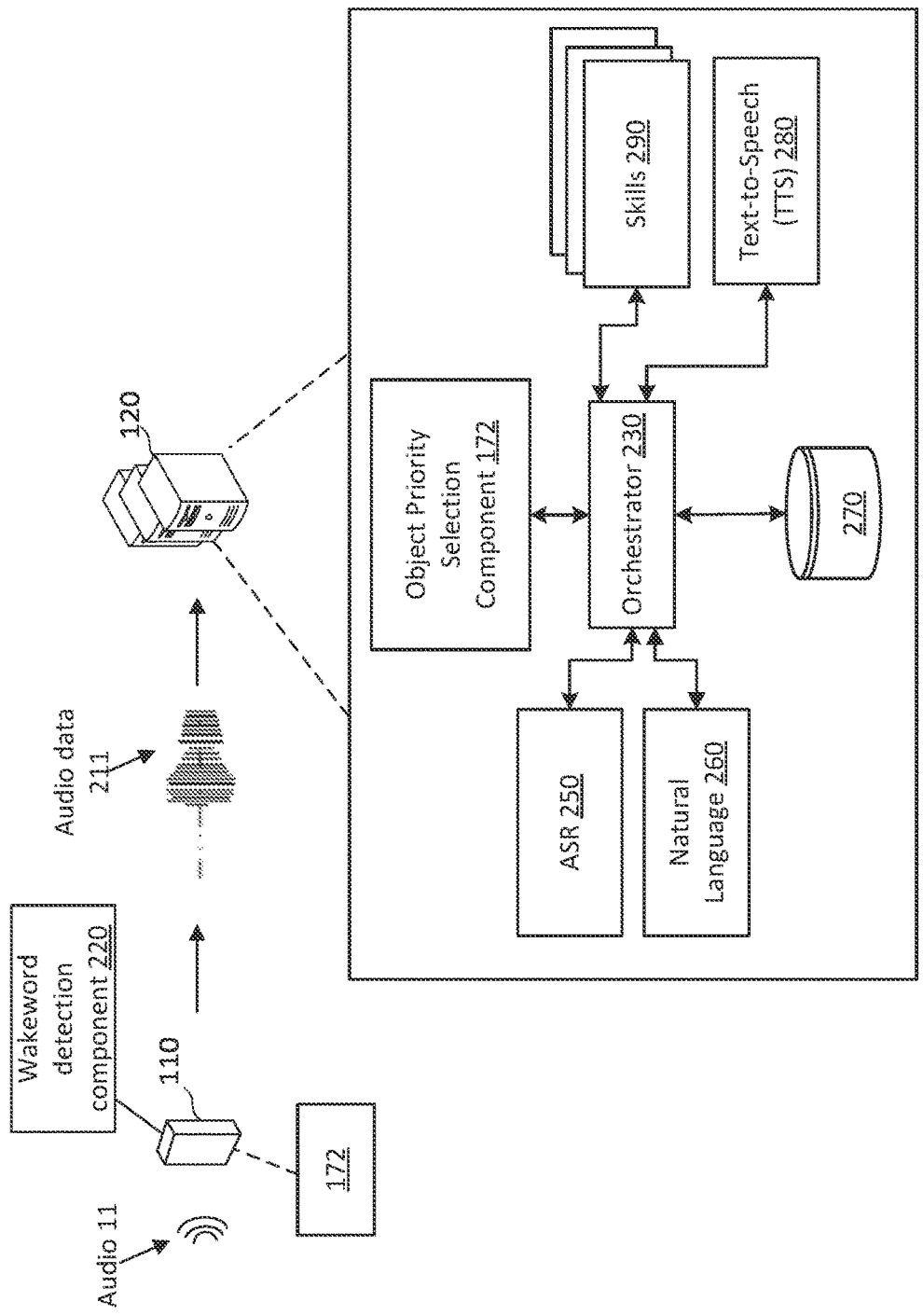
FIG. 2 is a block diagram of various components of a remote system that may be used in accordance with various aspects of the present disclosure.

FIG. 2 is a block diagram of various components of a remote system that may be used in accordance with various aspects of the present disclosure. Although not necessarily limited to such, the system may operate using various natural language processing components as described in FIG. 2. The various components may be located on same or different physical devices. Communication between various components may occur directly or across a network(s) 104. For example, the natural language processing components may be used to issue commands such as "Computer, focus on me" that may allow object priority selection component 172 to determine priority of individual objects for following during a video communication session, such as a video call.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 120 and/or may be provided by the user.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the natural language processing system 120. The audio data 211 may include data corresponding to the wakeword, or the portion of the audio data 211 corresponding to the wakeword may be removed by the device 110 prior to sending the audio data 211 to the natural language processing system 120.

Upon receipt by the natural language processing system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the natural language processing system 120, the gateway system 1025, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 120 that is akin to a software application running on a traditional computing device. That is, a skill component 290 may enable the natural language processing system 120 to execute specific functionality in order to perform one or more actions (e.g., provide information to a user, display content to a user, output music, or perform some other requested action). The natural language processing system 120 may be configured with more than one skill component 290. For example, a weather skill component may enable the natural language processing system 120 to provide weather information, a ride sharing skill component may enable the natural language processing system 120 to schedule a trip with respect to a ride sharing service, a restaurant skill component may enable the natural language processing system 120 to order food with respect to a restaurant's online ordering system, a communications skill component may enable the system to perform messaging or multi-endpoint communications, etc. A skill component 290 may operate in conjunction between the natural language processing system 120 and other devices such as the device 110 or a gateway system 1025 in order to complete certain functions. Inputs to a skill component 290 may come from various interactions and input sources. A skill component may include a communications skill 290a which may correspond to a service for performing media processing that may be operated, for example, by an MPU as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 120 (as illustrated in FIG. 2) or may be located at whole (or in part) with one or more separate systems. Unless expressly stated otherwise, reference to a skill, skill device, or skill component may include a skill component operating within the natural language processing system 120 (for example as skill component 290) and/or skill component operating within a system separate from the natural language processing system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented. In various examples, object priority selection component 172 may be implemented as a skill component 290. However, in various other examples, object priority selection component 172 may be implemented as other software executing on device 110. Object priority selection component 172 and/or SMC may receive commands from a skill component 290 associated with device 110 and may use such commands to control the behavior of device 110. For example, skill component 290 may translate the "Computer, focus on me" spoken command of a user to non-transitory computer-readable instructions interpretable by object priority selection component 172 and/or SMC which may, in turn, determine object priority (as described herein) and control device 110 to follow the individual issuing the command. Similarly, commands may be used to control device 110 to follow other individuals, to start and/or stop various processes (e.g., video calls, video and/or audio playback, execution of software, etc.).

The natural language processing system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include profile storage 270 and/or the gateway system 1025 may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 120 may be executed wholly or partially by device 110.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 110, or other devices discussed herein.

The natural language processing system 120 may include a user recognition component that recognizes one or more users associated with data input to the system. The user recognition component may take as input the audio data 211 and/or text data output by the ASR component 250. The user recognition component determines scores indicating whether user input originated from a particular user. For example, a first score may indicate a likelihood that the user input originated from a first user, a second score may indicate a likelihood that the user input originated from a second user, etc. The user recognition component also determines an overall confidence regarding the accuracy of user recognition operations. The user recognition component may perform user recognition by comparing audio characteristics in the audio data 211 to stored audio characteristics of users. The user recognition component may also perform user recognition by comparing biometric data (e.g., fingerprint data, iris data, etc.), received by the system in correlation with the present user input, to stored biometric data of users. The user recognition component may further perform user recognition by comparing image data (e.g., including a representation of at least a feature of a user), received by the system in correlation with the present user input, with stored image data including representations of features of different users. The user recognition component may perform additional user recognition processes, including those known in the art. Output of the user recognition component may include a single user identifier corresponding to the most likely user that originated the present user input. Alternatively, output of the user recognition component may include an N-best list of user identifiers with respective scores indicating likelihoods of respective users originating the present user input. The output of the user recognition component may be used to inform NLU processing as well as processing performed by other components of the system.

Figure 3A:
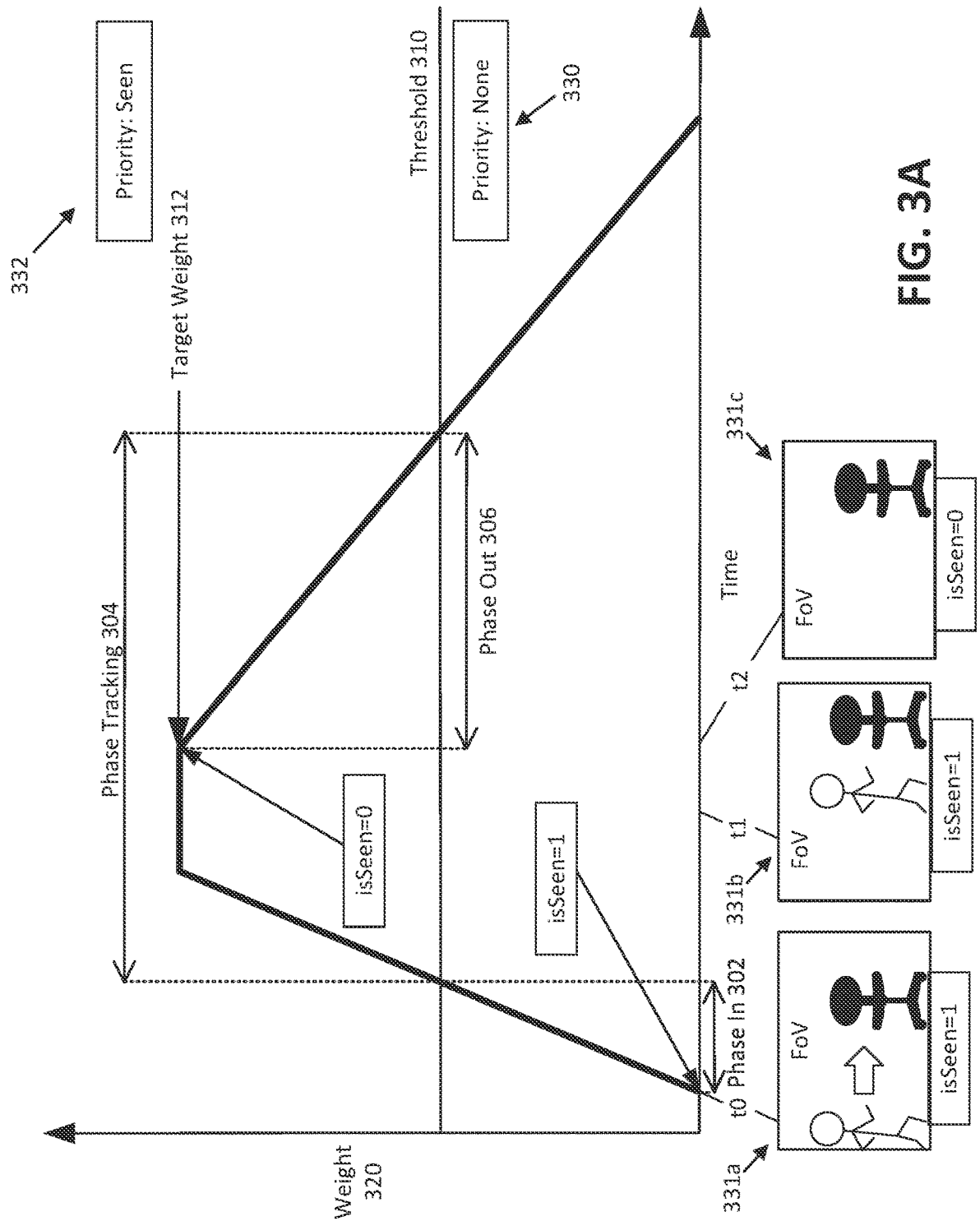
FIG. 3A is a diagram illustrating example weight change for a Boolean property used to select an objects to follow using computer vision, according to various embodiments of the present disclosure.

FIG. 3A is a diagram illustrating example weight change for a Boolean property used to select an object to follow using computer vision, according to various embodiments of the present disclosure. An object (e.g., a person, thing, or animal) may enter the FoV of camera 160 and may be detected as an object by CV executing on device 110. When an object is detected, an entry event for the property (IsSeen, in FIG. 3A) occurs. This is denoted in FIG. 3A as isSeen=1. Accordingly, frame of image data 331*a* depicts an example of a person entering the FoV of camera 160. Accordingly, frame of image data 331*a*, captured at time to, may correspond to an entry event at which isSeen becomes true (e.g., isSeen=1).

Phase In 302 is the time until an object reaches a higher priority level. In the example of FIG. 3A, this occurs when the weight for the object crosses threshold 310, transitioning the priority level of the object from "None" (priority level 330) to "Seen" (priority level 332). Threshold 310 is specific to the particular property (IsSeen in FIG. 3A) and the weight calculation is specific to the detected object. Similar calculations may be performed for each detected object. As described above, the weight accumulates for the detected object as Ts*Ws as long as isSeen is true. As shown in FIG. 3A, the weight may accumulate while isSeen is true until the target weight 312 for the isSeen property is reached. Phase tracking 304 occurs while the entity weight 320 exceeds the threshold 310 for the isSeen property. Frame of image frame 331*b*, captured at time t1, may correspond to an example of an object (e.g., the person) attaining a weight that exceeds the threshold 310. The person depicted in image frame 331*b* may have been visible (e.g., detected by CV) within the FoV of camera 160 for a long enough period of time to attain a weight (calculated using Ts*Ws) that exceeds threshold 310. Accordingly, the individual depicted in image frame 331*b* may be followed by camera 160 provided that the individual is of the highest priority group among all objects detected with the current FoV.

isSeen may become false when the object leaves the FoV of camera 160. At such time, there is a phase out 306 period where the objects weight is modified by Te*We. When the objects weight falls below threshold 310, the priority level for the object transitions from "Seen" (priority level 332) to "None" (priority level 330). At such time, if another object continues to have the "Seen" priority level, this other object is followed by device 110 while the object with priority level 330 ("None") may cease to be followed.

Phase tracking 304 includes active tracking time and waiting time after the object is lost (e.g., leaves the FoV and isSeen=0). During this time the device 110 follows the object if its priority is highest (or tied for highest) among all objects. The Phase Out 306 allows the device 110 to wait for a certain amount of time after the object leaves the FoV (e.g., after isSeen=0). Phase out 306 is given by (Target Weight−Threshold)/We (s). Frame of image data 331c, captured at time t2, may correspond to an example of an object (e.g., the person) leaving the FoV. Accordingly, at time t2 an exit event occurs with isSeen=0. Thereafter, the weight of the previously-detected object (e.g., the person) may decrease. When the weight of the previously-detected object falls below threshold 310 the priority level of the detected object decreases from the Seen priority level 332 to "None" (priority level 330).

Figure 3B:
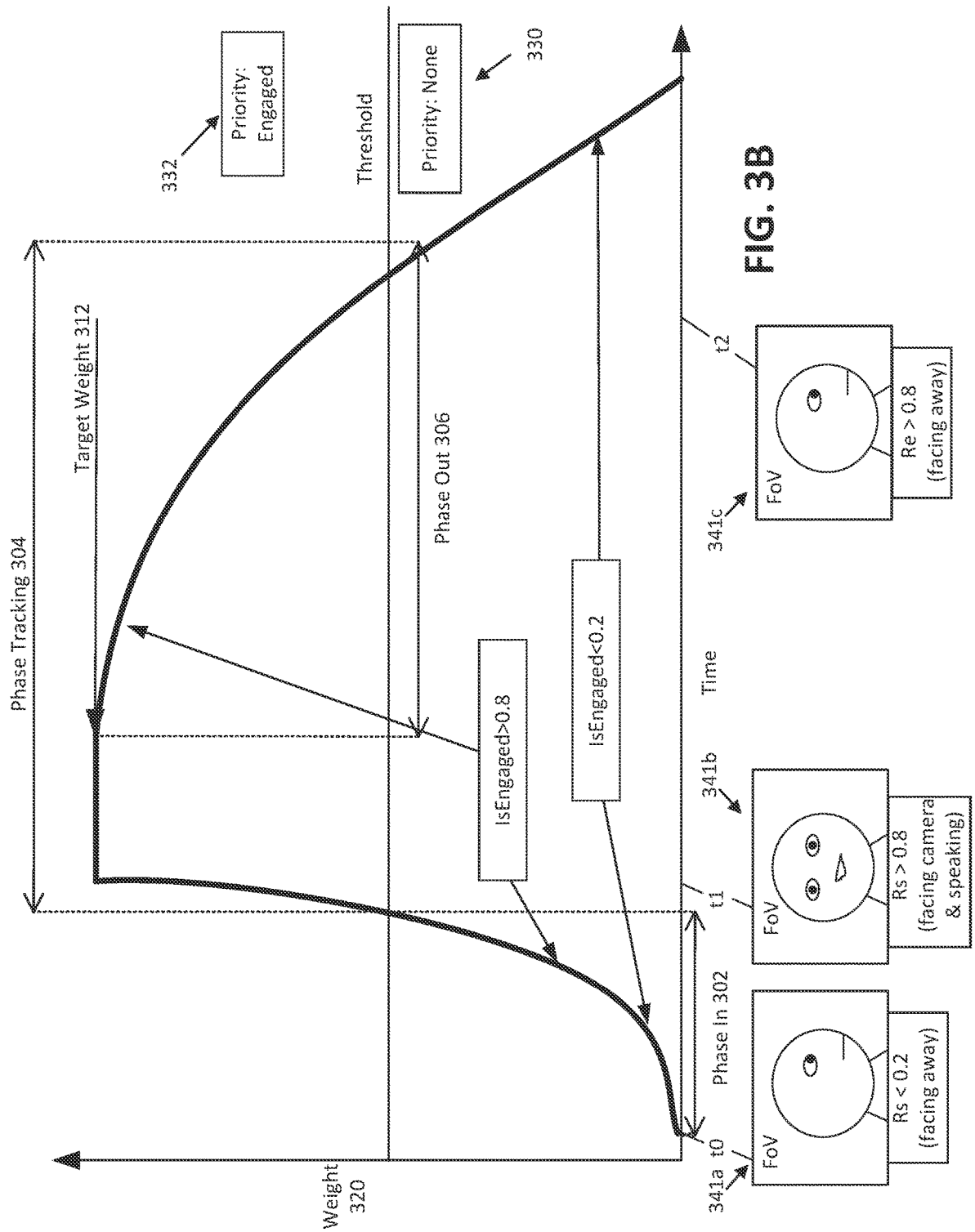
FIG. 3B is a diagram illustrating example weight change for a number property used to select an object to follow using computer vision, according to various embodiments of the present disclosure.

FIG. 3B is a diagram illustrating example weight change for a number property used to select an object to follow using computer vision, according to various embodiments of the present disclosure. In the example of FIG. 3B, an object (e.g., a person) may begin engaging in the conversation, but may have a low engagement level (e.g., the person may not be looking at the screen). For example, the person depicted in image frame 341a may be within camera 160's FoV, but may not be engaged in the conversation (e.g., as detected by CV, the person may be looking away from the camera 160 and may not be engaged in conversation). Accordingly, the individual depicted in image frame 341a may be determined to have a low score (e.g., <0.2) for the IsEngaged property. As such, it may take a longer time to follow this object, as the weight is increasing slowly due to a low ratio Rs. Engagement may be determined using a CV algorithm based on such factors as the object facing the camera, speaking while facing the camera, body position, etc. In the example, at a time t1, the person depicted in image frame 341b may be engaged (e.g., facing the camera 160 and speaking). Accordingly, the person may have a higher score for the isEngaged property (e.g., >0.8) relative to the score for the person at time to. When the engagement value is high (e.g., Rs>0.8), the weight increases faster and the object may be followed in less wait time relative to an object with low engagement value.

Conversely, when an object begins disengaging from the conversation, if the engagement level is high, then it will take longer time to remove the object from the high priority level group, as the weight is dropping slowly (e.g., Re<0.2). Using such non-linear functions, the device 110 has a better chance of including the engaged object into the conversation while minimizing the chance that an object is mistakenly excluded. In the example depicted in FIG. 3B, the person depicted in image frame 341c may have become disengaged from the conversation/video call for a prolonged period of time. As such, at time t2, the Re score may be relative high (e.g., >0.8), resulting in the weight dropping more quickly and eventually resulting in the person's priority level dropping.

Figure 3C:
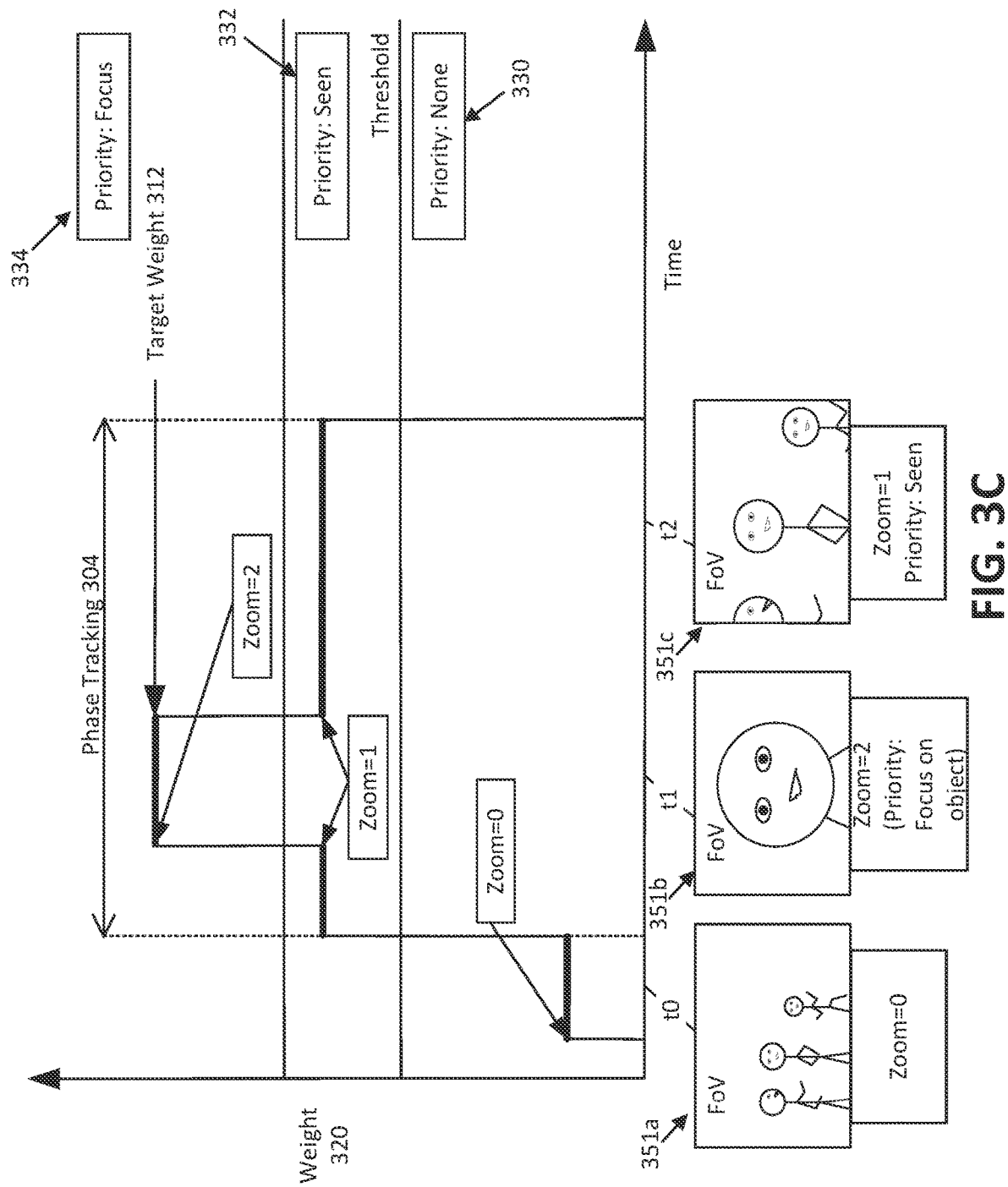
FIG. 3C is a diagram illustrating an example weight change for a staged property used to select an object to follow using computer vision, according to various embodiments of the present disclosure.

FIG. 3C is a diagram illustrating an example weight change for a staged property (e.g., Zoom level) used to select an object to follow using computer vision, according to various embodiments of the present disclosure.

A user may want different levels of zoom when the device 110 is following an object. For example, different options may include fully zoomed-out with maximum field-of-view (e.g., zoom=0), middle zoom-in level to show both the body and face of the person (e.g., zoom=1), and fully zoomed-in to show mainly the face of the person talking (e.g., zoom=2). In the example depicted in FIG. 3C, image frame 351a has a wide-angle FOV depicting three people. When a user has issued a command to change the zoom level, the weight of this user can also change. For example, when the device is in zoom level 0, and user has requested, "Computer, zoom in," the weight of the user is in the SEEN priority level. Image frame 351c (at time t2) depicts an image frame after a user has requested that the zoom level be increased from the wide angle FoV of image frame 351a. In the example, the center person may have issued the command, "Computer, zoom in on me," or similar.

If there are other people in the view, the device may attempt to frame all of the individuals if the user issuing the zoom-in command has the same priority level as other seen persons. However, if this user issues the same command ("Computer, zoom in") again, this user's weight will increase to a new level that is above other seen persons (e.g., at zoom=2). Now the device 110 may focus on this user and ignore other persons, even though they may still be in the FoV. In this example, the user's priority level may be priority level 334 ("Focus"). Image frame 351b (at time t1) depicts an example where a user has achieved zoom=2. Accordingly, the image frame 351b depicts primarily the user's head and shoulders.

FIG. 4 depicts an example of weight calculation of three properties for a single object, according to various embodiments of the present disclosure. In FIG. 4, the three example properties are isFollowing, isEngaged, and isSeen. Additional or fewer properties may be used in accordance with the various techniques described herein, according to the desired implementation.

In FIG. 4, there are three priority levels 402, 404, and 406. The priority level 402, corresponding to the isFollowing property, may be the highest priority level. Priority level 404, corresponding to the isEngaged property, may be the second highest priority level, and priority level 406, corresponding to the isSeen property may be the third highest priority level. There may also be a "None" priority level (not shown in FIG. 4).

In the example of FIG. 4, the isFollowing property may become true when a user issues an explicit command to be followed (e.g., using a voice command such as "Computer, follow me" and/or a GUI input). The weight threshold WT for the isFollowing property is 2000 in the example of FIG. 4. However, the Ws is 20000. Accordingly, only 1/10 of a second from issuance of such an explicit command elapses before the object issuing such a command achieves the isFollowing priority level. However, the We value has a smaller magnitude relative to the Ws value, resulting in a longer period of time before the object's priority level is decreased. For example, it may take 18 seconds (−100/s) (18s) until the object's priority level decreases from 20,000 to the threshold WT=2000.

The isEngaged property may become true when the weight of the individual exceeds 1000. In the example of FIG. 4, this may occur in 5 seconds from the time at which an isEngaged event occurs. However, if an entry/start ratio (Rs) is used, this amount of time may depend on the level of engagement, as described above. As noted in FIG. 4, if there are two users within the FoV for which the isEngaged event is true, and who have equal priority level, the isEngaged We provides a natural priority level shift akin to human interaction. For example, if both users are initially engaged and speaking, but one user disengages (e.g., faces away from the camera and/or stops talking) for longer than 5 seconds, the person who disengages may fall to a lower priority level resulting in the camera following only the engaged person.

The isSeen property becomes true after five seconds. This avoids "jerky" camera panning by avoiding following objects that are merely moving through the frame. For example, if a video call is started, the camera may avoid panning to follow a person that walks through the background.

Figure 5:
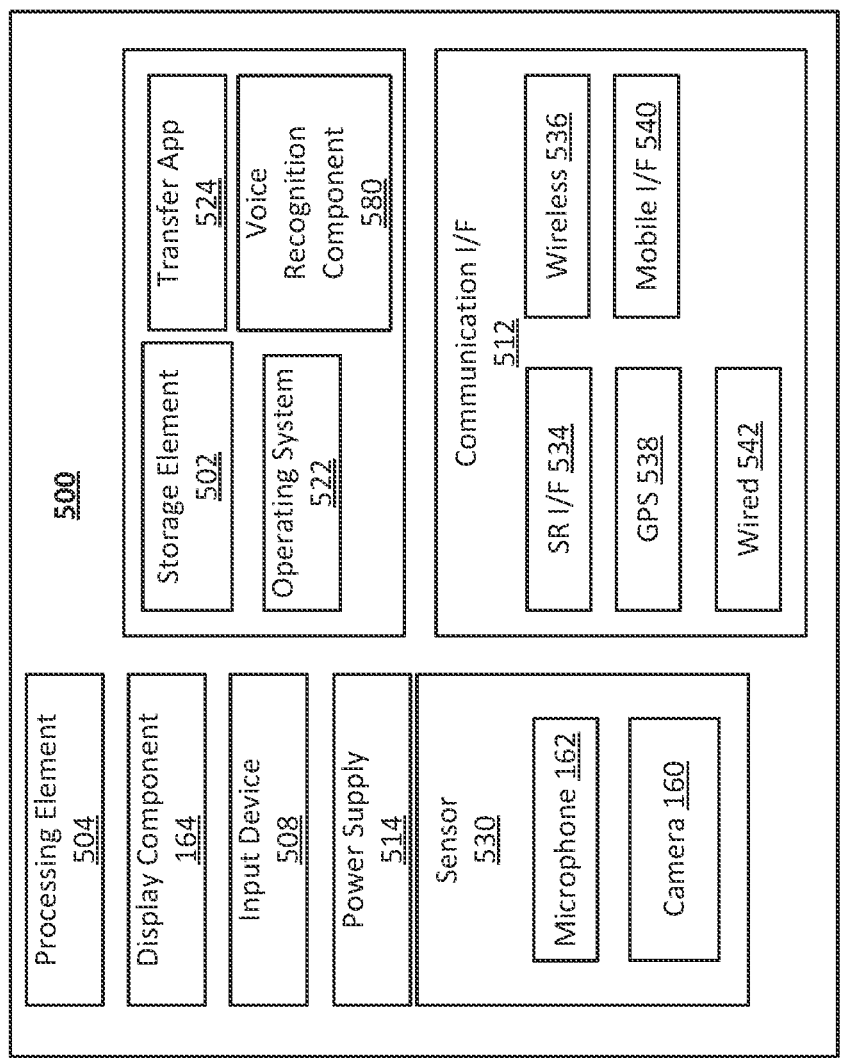
FIG. 5 is a block diagram showing an example system of a computing device that may be used in accordance with various embodiments described herein.

FIG. 5 is a block diagram showing an example system 500 of a computing device that may be used to implement, at least in part, one or more of the components described herein for determination of object priority level, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs), tensor processing units, graphical processing units, etc. In some examples, the processing element 504 may be effective to determine a wakeword and/or to stream audio data to natural language processing system 120. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor and/or microphone included in the system 500. In some examples, the transfer application 524 may also be configured to send the received voice requests to one or more voice recognition servers (e.g., natural language processing system 120).

When implemented in some user devices, the system 500 may also comprise a display component 164. The display component 164 may comprise one or more light-emitting diodes (LEDs) or other suitable display lamps. Also, in some examples, the display component 164 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 164 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone or an array of microphones for capturing sounds, such as voice requests. A voice recognition component 580 may interpret audio signals of sound captured by microphone. In some examples, voice recognition component 580 may listen for a "wakeword" to be received by microphone 162. Upon receipt of the wakeword, voice recognition component 580 may stream audio to a voice recognition server for analysis, such as natural language processing system 120. In various examples, voice recognition component 580 may stream audio to external computing devices via communication interface 512.

When the display component 164 includes a touch-sensitive display, the input devices 508 can include a touch sensor that operates in conjunction with the display component 164 to permit users to interact with the image displayed by the display component 164 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol. The system 500 may also include one or more sensors 530 such as, for example, one or more position sensors, camera(s) 160, and/or motion sensors.

FIG. 6 is a table depicting an example of weight calculation for five properties for a single object, according to an embodiment of the present disclosure. In FIG. 6, the five properties are isFollowing (priority level 602), isEngaged && isSpeaking (priority level 604), isEngaged (priority level 606), isSpeaking (priority level 608), and isSeen (priority level 610). As in FIG. 4, isFollowing may be the highest priority level. This may be natural, in terms of intuitive human expectation of a conversation, as a direct, explicit command (e.g., "Computer, focus on me") may be used to trigger the isFollowing event.

The next highest priority level may be when the events isEngaged and isSpeaking are simultaneously true, followed by the priority levels for isEngaged, isSpeaking, and isSeen. As can be seen, various implementations may be used for the different priority levels. Additionally, the weight thresholds WT, Ws, We, Rs, Re, etc., may be parameters that affect transitions between priority levels and the amount of time it takes to transition between such priority levels. Accordingly, such parameters may be tuned to provide an intuitive interaction during video communication sessions such as video calls.

In various examples, each individual property may have its own weight calculated and evaluated separately. However, there are circumstances when one property's state may affect how another property calculates its weight.

For example, during a call a person may open a door and become temporarily blocked from view by the opened door. This person may want the device to continue to frame the last known position of the individual, so that when the person closes the door the device can resume tracking him/her without panning to the rest of the environment. The phase out time for this temporary blocking can be set to 5 seconds. If within 5 seconds this person reappears, then the device will resume tracking. Conversely, if this person disappears for more than 5 seconds, then the device may timeout and may fully zoom out, to see the wider environment and/or to wait for a new person to enter the FoV.

In a different scenario, a person may specifically ask the device 110 to track him/her. In such an example, when the person leaves the field-of-view, the device 110 may wait for a longer period of time (e.g., 20 seconds, 1 minute, etc.) before timeout and beginning to track other persons. To achieve such design requirements, the weight dropping rate of the property isSeen may depend on the value of the property isFollowing. If isFollowing is false, then isSeen weight may drop to 0 in 5 seconds. However, if isFollowing is true, then isSeen may drop more slowly and reach 0 in 60 seconds. Accordingly, in some implementations, the We value for one property may depend on the value and/or existence (e.g., True/False) of a different property. In the foregoing example, the We value of the isSeen property may change depending on the value of isFollowing.

To be flexible and adaptive to future interaction and transitioning between different properties, an observer/publisher design pattern may be used. In such an example implementation, each property may inherit the StatusObserver class and may subscribe to the same status subject class using independent injection for a single object. Every time the property changes, it may report its change by calling statusSubject.on( ) or off( ) functions. The changes may be recorded and aggregated. When all properties have updated and reported their latest changes, the status subject will then publish its latest status to each observer (property). Based on the changes, each property can filter out the change it is interested in and update the calculator accordingly.

Among the potential benefits of the various object selection priority techniques described herein are:
(1) Fast processing The object detection event may execute at 10 Hz. Accordingly, the processing of object weight may be determined over a short period of time. However, the calculator described herein (e.g., the weight calculation equation described above) is pure mathematical processing and can be completed within 1 ms.
(2) Easier thread management and control. Because of the speed of the techniques described herein, the time management and thread management of the objects can also be simplified. There is less chance of managing delayed process or using multiple threads to process object events when the system is busy.
(3) Configurable. To change the behavior of the object, the calculator and/or the parameters for the calculator may easily be changed to provide a different priority schema. Additional (or fewer) properties may be defined and selected for calculation of weights/object priority.
(4) Expandable. It is easy to apply different sets of calculator parameters for different themes or conditions (e.g., family calling, partying, education, demonstration, etc.).
(5) Remote configuration or update. It is possible to push new configuration(s) to device remotely without changing the application.

Interaction Between Multiple Objects

There are cases when one object's property change may affect another object's property. For example, there may be only one person that can be followed/focused on by the device. If a new person asks the device to follow them, the existing person's follow status will be lost. The transition of property changes between objects are through EnvironmentContext.

There are three major functions for EnvironmentContext:
(1) Accept updates for objects.
A) From SmartMotionClient, updates about objects like new objects being identified, existing objects moving around or being lost, etc.
B) the current system time may be used update the weight of each object
C) From commands received from a user, such as enable one object to be followed, and/or disabling tracking for all objects, etc.
(2) Update object properties based on environment changes:
(A) Remove expired objects
(B) Apply singleton property in the environment (e.g., there is only one object can be followed. If a new one is assigned, the existing one need to be removed).
(3) Provide sorted list of objects based on their weight.

An EventBus model (FIG. 9) may be used to accept and delivery events to objects and exchange information between objects and environment context. For example, at the beginning of a video call, each object may be registered on EventBus and specify the specific events it want to accept.

For example, at the beginning of a call, the caller may say, "Call mom," but at the callee side, "mom" may not be in the FOV. Instead, "dad" (object1) may answer the call and be in the FoV. In various examples, when the voice of the callee (mom) has been recognized (e.g., using various audio identification techniques), the device will automatically switch to the person that is the targeted person of the call. Next, in the example, mom (object2) may enter the FOV, and a new event ("New object identified") may be generated and sent to the EventBus. Object2 may also register the event to be notified by EventBus when object2's voice is recognized. In various examples, when the voice has been processed to determine the voice id, object1 may accept this event and reply "VoiceId does not match" into EventBus. Object2 may also receive this event and may reply, "VoiceId matched" into EventBus. The EnvironmentContext may record Object2 (mom) as the priority person. The device may frame both objects as their weights are the same. If the two objects (mom and dad) are moving around, the device may follow object2 since it is the targeted person (e.g., the callee).

Figure 9:
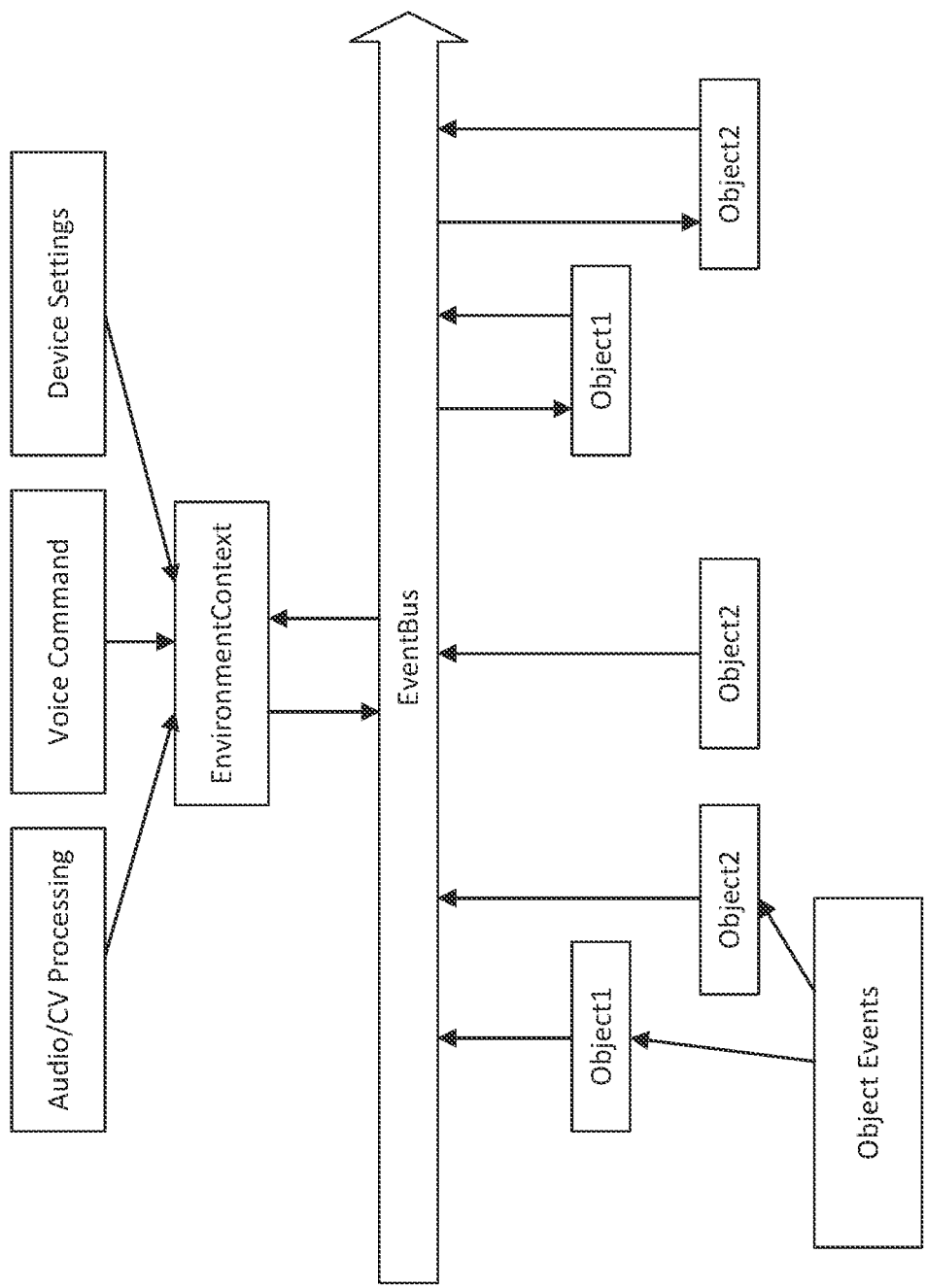
FIG. 9 is an EventBus model used to accept and deliver events to objects and to exchange information between objects and environment context.

There may be multiple events that can be sent to EventBus, such as a user issuing voice commands, touching the GUI, changing device settings or pressing privacy button, etc. Such events may arrive in EnvironmentContext as commands or events, and objects expecting the events may receive and process them. FIG. 9 is an example depiction of the EventBus and object communication with Environment context.

Figure 7:
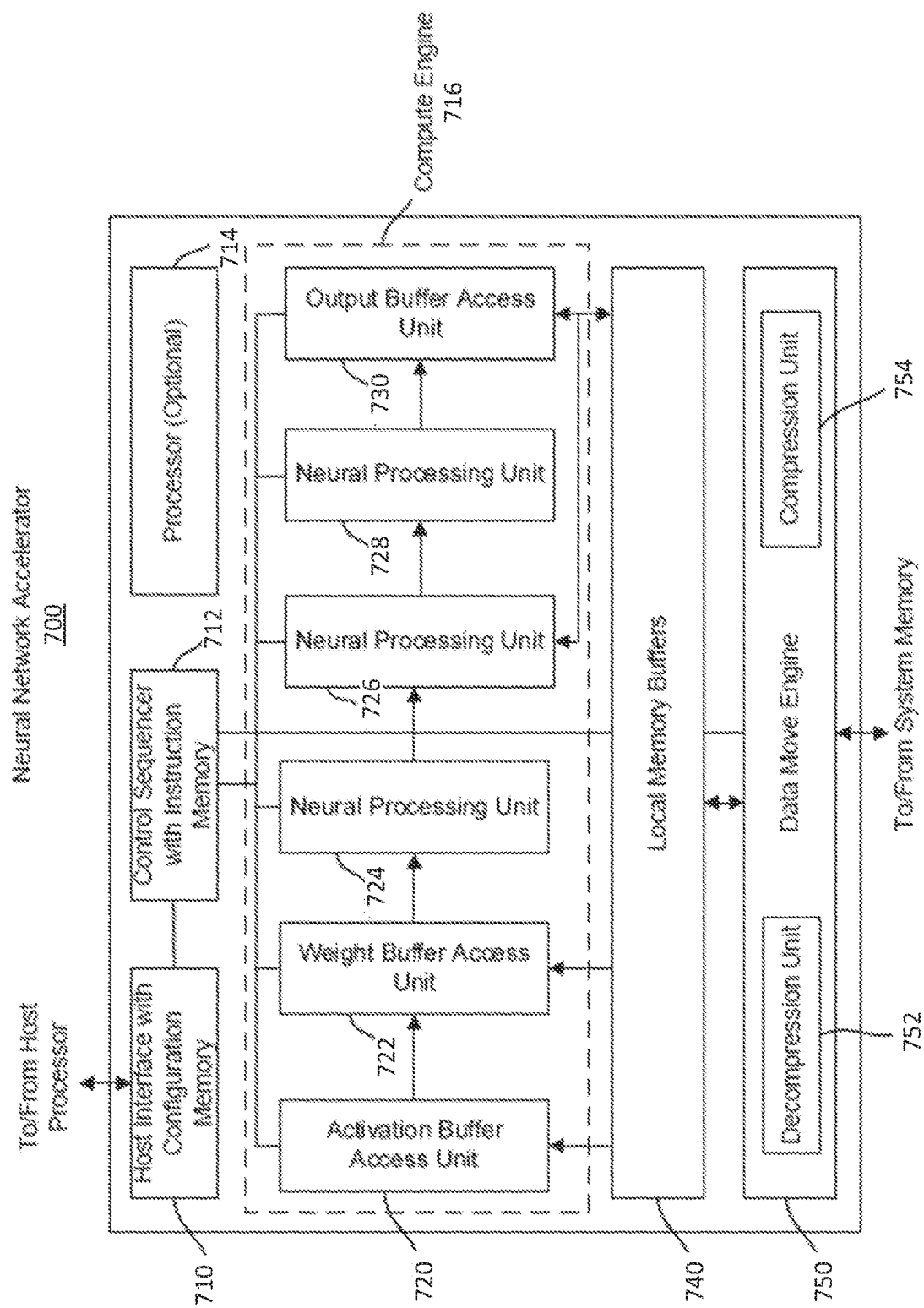
FIG. 7 is a block diagram of an example neural network accelerator that may be used to perform one or more of the various computer visions and/or object selection techniques described herein.

FIG. 7 is a simplified block diagram of an neural network accelerator (NNA) 700 according to certain embodiments. The NNA 100 may be, for example, a dedicated chip set and/or may be integrated into circuitry of the device 110. The NNA 700 comprises a host interface 710, a control sequencer 712, an optional processor 714, an activation buffer access unit 720, a weight buffer access unit 722, a plurality of neural processing units (NPUs) 724, 726, and 728, an output buffer access unit 730, a set of local memory buffers 740, and a data move engine (DME) 750. The activation buffer access unit 720, the weight buffer access unit 722, the NPUs 724, 726, and 728, and the output buffer access unit 730 collectively form a compute engine 716. Along with the control sequencer 712 and the DME 750, the compute engine 716 is responsible for executing instructions. The NNA 700 can be implemented as a standalone computing system or, as shown in FIG. 7, as part of a computing system comprising a host processor and system memory. In various examples, NNA 100 may be used to implement various computer vision techniques, voice processing techniques, natural language processing techniques, and/or other machine learning techniques described herein. In various examples, machine learning models implemented in whole or in part by NNA 100 may be used to detect objects in image data and/or predict levels of engagement with device 110, as described above. In various examples, NNA 100 may be used to implement one or more aspects of object priority selection component 172.

The NNA 700 depicted in FIG. 7 is merely an example and is not intended to unduly limit the scope of claimed embodiments. One of ordinary skill in the art would recognize many possible variations, alternatives, and modifications. For example, in some implementations, NNA 700 may have more or fewer components than those shown in FIG. 7, may combine two or more components, or may have a different configuration or arrangement of components.

The NNA 700 generally executes one set of instructions at a time. This set of instructions is referred to herein as a "context." At runtime, the NNA 700 sequences and dispatches, using control sequencer 712, instructions from a pre-compiled context for execution. In certain embodiments, each context comprises a set of instructions that ends with a HALT instruction. Contexts are created by a software compiler. The instructions within a context can implement at least part of a neural network. For example, a context can correspond to a complete layer, a partial layer, or multiple layers of the neural network. In some instances, a context can correspond to a complete neural network (e.g., with instructions for an input layer, a hidden layer, and an output layer).

The host interface 710 is a communication interface to the host processor (not depicted) of the local computing system. The local computing system includes system memory for storing data operated on by the NNA (e.g., weights, activations, and output values corresponding to inferences). The NNA 700 may be communicatively coupled to multiple hosts simultaneously, with any one of the hosts being able to program the NNA 700 to execute neural network-related tasks on behalf of the host. The host interface 710 can communicate with the host processor via a standard communication protocol such as, for example, Advanced extensible Interface (AXI) protocol. Similarly, the NNA 700 can include a separate communication interface for communicating with the system memory, e.g., to read and write data from the local memory buffers 740 to the system memory. The communication interface to the system memory is, in certain embodiments, integrated into the DME 750. Thus, the DME 750 can also include an AXI interface.

The control sequencer 712 is responsible for sequencing, dispatching and finishing execution of instructions. Some instructions are executed entirely in the control sequencer 712. Other instructions may be dispatched to one or more of the NPUs 724, 726, and 728 for execution, possibly with execution results being returned to the control sequencer 712 for further processing. Still other instructions are executed by the DME 750 to move data to and from the local memory buffers 740. More than one instruction can be in the execution phase at any given time within the NNA 700. The control sequencer 712 can include an instruction memory into which instructions to be executed by the NNA 700 are downloaded from the host processor or loaded from the system memory.

In the example of FIG. 7, the host interface 710 includes a configuration memory. The configuration memory may include one or more registers that are configurable by the host processor to specify parameters relating to the context to be executed, e.g., various context dependent parameter registers (CDPRs).

In certain embodiments, the configuration memory includes a predicate register for synchronizing execution of instructions. Instructions are broadcast by the control sequencer 712 to each component of the compute engine 716 as well as the local memory buffers 740 and the DME 750. Upon receipt of a broadcast instruction, a component may proceed to execute at least part of the instruction in response to determining that the component is capable of handling the instruction. For example, the DME 750 could receive and execute a data move instruction, but the NPUs 724, 726, and 728 could ignore the data move instruction. Because instructions can execute concurrently in different components, it is useful to have a synchronization mechanism to handle any dependencies between instructions. The predicate register can be used to implement such a synchronization mechanism and, in certain embodiments, is a global register visible to internal components of the NNA 700, as well as visible to external objects such as the host processor. Synchronization also helps to prevent conflicts in accessing the local memory buffers 740.

The processor 714 is an optional general purpose processor for performing certain types of processing in parallel with processing performed by the NPUs 724, 726, and 728. For example, processor 714 may include a floating point unit or other arithmetic logic unit for performing general arithmetic operations in parallel with matrix operations performed by the NPUs 724, 726, and 728.

The activation buffer access unit 720 is configured to access one or more activation buffers in the local memory buffers 740. Similarly, the weight buffer access unit 722 and the output buffer access unit 730 are configured to access one or more weight buffers and one or more output buffers, respectively. The activations stored in the activation buffer(s) correspond to activations produced by one or more layers of a neural network being executed on the NNA 700.

The weights stored in the weight buffer(s) are synaptic weights associated with edges between a node of one layer and a node of another layer. Activation and weights are used for certain computations, including for instructions executed by the compute engine 716. The output buffers can store final results or intermediate results (e.g., partial sums) for access by the host processor or the system memory.

The NPUs 724, 726, and 728 perform numerical operations using the activations and weights stored in the local memory buffers 740. Each NPU is configured to perform all or part of a compute instruction. Although FIG. 7 depicts the NPUs 724, 726, and 728 as block components, the NPUs 724, 726, and 728 are not necessarily identical.

The DME 750 is used to bidirectionally move instructions and data between the system memory and NNA local memories (e.g., the activation, the weight, and output buffers that form the local memory buffers 740). The DME 750 can receive data move instructions (e.g., LOAD and STORE instructions) from the control sequencer 712 when such instructions are broadcast. The data move instructions executed by DME 750 can execute concurrently with compute instructions executed by the control sequencer 712 or the compute engine 716.

As shown in FIG. 7, the DME 750 includes a decompression unit 752 and a compression unit 754. In other embodiments, the DME 750 may include a decompression unit or a compression unit, but not both. Further, the location of the compression unit or decompression unit can vary. For example, in another embodiment, the decompression unit 752 can be part of the compute engine 716 and is configured to decompress data stored in the local memory buffers 740 for input of the decompressed data to one or more of the NPUs 724, 726, and 728. The decompression unit 752 implements a decompression pipeline. The decompression pipeline of the decompression unit 752 involves processing using one or more decompression schemes. The decompression unit 752 can select between using one decompression scheme alone or using multiple decompression schemes in combination. For example, the decompression unit 752 may decompress data using zero value decompression and then further decompress the data using shared value decompression. In the example of zero value plus shared value decompression, the order in which the compression schemes are applied can vary depending on how the decompression unit 752 is implemented. Thus, zero value decompression could be performed first followed by shared value decompression. Alternatively, shared value decompression could be performed first. In general, the order in which zero value decompression and shared value decompression are performed does not matter as the resulting decompressed data would be the same irrespective of which decompression scheme is applied first.

Although the example embodiments are described in connection with zero value compression/decompression and shared value compression/decompression, other techniques for compressing and decompressing data can be implemented. These are merely two examples of compression/decompression schemes that are suitable for use with the types of data involved in neural networks.

In the example of FIG. 7, the decompression unit 752 may be configured to receive compressed data from the system memory and decompress the compressed data, using one or more decompression schemes, to generate decompressed data for storage in the local memory buffers. Alternatively, in certain embodiments, the decompression unit 752 may be configured to receive compressed data from the local memory buffers and decompress the compressed data for use by a processing component of the NNA 700 (e.g., one of the NPUs 724, 726, and 728, or the control sequencer 712). Thus, the data may be stored in either compressed or decompress form within the local memory buffers 740. Irrespective of how the data is stored in the local memory buffers 740, the data may be sent from the system memory to the NNA 700 in compressed form. Sending the data to the NNA in compressed form reduces the amount of time required to send the data.

The compression unit 754 implements a compression pipeline similar to the decompression pipeline discussed above with respect to the decompression unit 752. In certain embodiments, the compression unit 754 is configured to receive uncompressed data produced by the neural network (e.g., output values corresponding to inferences and/or activations generated by a particular layer of the neural network) and apply one or more compression schemes to compress the uncompressed data for storage in the local memory buffers 740 or for storage in the system memory. For example, activations produced by one layer can be compressed for temporary storage in an activation buffer of the local memory buffers 740 until the activations are needed by one of the NPUs 724, 726, 728. Storing the activations in compressed form increases the effective storage capacity of the activation buffer. For the same amount of physical memory, more activations can be stored when the activations are compressed compared to when the activations are stored uncompressed. As another example, inferences produced by the output layer of the neural network or activations produced by a particular layer can be compressed for storage in the system memory.

The local memory buffers 740 are used to abstract the physical implementation of memories that form the activation, weight, and output buffers from NNA components (e.g., the compute engine 716 and the DME 750) that access data in these buffers. The data in the activation, weight, and output buffers is accessed through addressing the buffers individually, with the buffer addresses being mapped to the physical addresses of the memories where the data is stored. In certain embodiments, the memories of the local memory buffers 740 are implemented as static random-access memory (SRAM) devices. However, the local memory buffers 740 can be implemented using other types of memory, both volatile and non-volatile (e.g., flash memory, DRAM, resistive RAMs, and the like). As mentioned above, the data in be stored in the local memory buffers 740 in compressed or decompressed form.

The NPUs 724, 726, and 728 perform numerical operations using the activations and weights stored in the local memory buffers 740. Each NPU is configured to perform all or part of a compute instruction. The compute instruction may, for example, implement at least some of the computation described earlier in connection with processing by a node of a neural network, i.e., computing a weighted sum of input activations multiplied by weights, adding a bias value to the weighted sum, and then applying an activation function. Other types of computations may also be performed by the NPUs 724, 726, and 728 including, for example, identifying the minimum and maximum values among a first set of data values represented by a first vector and a second set of data values represented by a second vector, performing an extended multiply add, subtracting two vectors, and other types of operations applicable to data from a vector or matrix.

Figure 8:
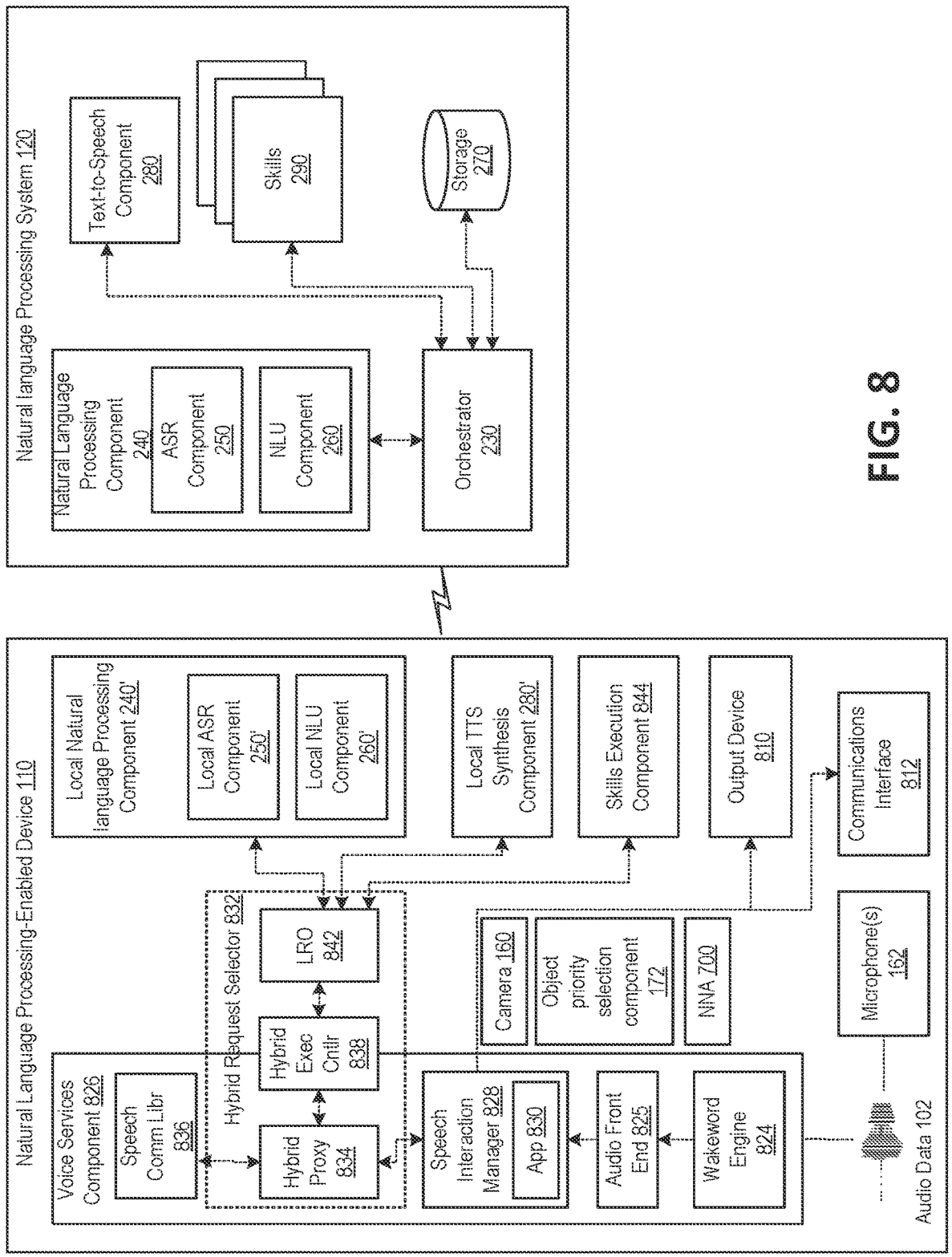
FIG. 8 is a block diagram illustrating a speech processing-enabled device and a speech processing management system, in accordance with embodiments of the present disclosure.

FIG. 8 is a block diagram illustrating a natural language processing-enabled device 110 and a natural language processing system 120, in accordance with embodiments of the present disclosure. In various examples, device 110 may be a natural language processing-enabled device and may include microphones (e.g., far-field microphone arrays) used to transform audio into electrical signals. Natural language processing may then be performed, either locally by the natural language processing-enabled device 110, by one or more other computing devices communicating with the natural language processing-enabled device 110 over a network (e.g., natural language processing system 120), or by some combination of the natural language processing-enabled device 110 and the one or more other computing devices. In various examples, natural language processing-enabled device 110 may include and/or may be configured in communication with output device(s) 810 (e.g., speakers and/or displays) effective to output information obtained in response to a user's spoken request or command, or to output content that may be of interest to one or more users. As used herein, a display of natural language processing-enabled device 110 refers to a display effective to output graphics such as images and/or video. Further, as used herein, a displayless device refers to a device that does not include a display that is effective to render graphical images or text.

In various examples, the device 110 may include the object priority selection component 172 described herein and/or the NNA 700. As such, device 110 may perform computer vision techniques, audio processing, and/or machine learning techniques locally on device 110 without sending data to remote devices for such processing. Accordingly, natural language processing-enabled device 110 may be effective to receive commands such as "Computer, focus on me" and/or "Start video call with mom" to control the device 110 to initiate a video call, and/or to follow a particular person during a video call.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 162 to capture utterances and convert them into digital audio data 102, the natural language processing-enabled device 110 may additionally, or alternatively, receive audio data 102 (e.g., via the communications interface 812) from another device in the environment. In various examples, the natural language processing-enabled device 110 may capture video and/or other image data using an camera 160. Under normal conditions, the natural language processing-enabled device 110 may operate in conjunction with and/or under the control of a remote, network-based or network-accessible natural language processing system 120. The natural language processing system 120 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 120 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 110. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 120 may be configured to receive audio data 102 from the natural language processing-enabled device 110, to recognize speech in the received audio data 102, and to perform functions in response to the recognized speech. In some embodiments, these functions involve sending a command, from the natural language processing system 120, to the natural language processing-enabled device 110 to cause the natural language processing-enabled device 110 to perform an action, such as output an audible response to the user speech via output device 810 (e.g., one or more loudspeakers). Thus, under normal conditions, when the natural language processing-enabled device 110 is able to communicate with the natural language processing system 120 over a WAN (e.g., the Internet), some or all of the functions capable of being performed by the natural language processing system 120 may be performed by sending a command over a WAN to the natural language processing-enabled device 110, which, in turn, may process the command for performing actions. For example, the natural language processing system 120, via a remote command that is included in remote response data, may instruct the natural language processing-enabled device 110 to output an audible response (e.g., using a local text-to-speech (TTS) synthesis component 280) to a user's question, to output content (e.g., music) via output device 810 (e.g., one or more loudspeakers) of the natural language processing-enabled device 110, or to control other devices in the local environment (e.g., the user's home). It is to be appreciated that the natural language processing system 120 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled device 110 may include a local voice services component 826. When a user utterance including the wakeword is captured by the microphone 162 of the natural language processing-enabled device 110, the audio data 102 representing the utterance is received by a wakeword engine 824 of the voice services component 826. The wakeword engine 824 may be configured to compare the audio data 102 to stored models used to detect a wakeword (e.g., "Computer") that indicates to the natural language processing-enabled device 110 that the audio data 102 is to be processed for determining an intent. Thus, the wakeword engine 824 is configured to determine whether a wakeword is detected in the audio data 102, and, if a wakeword is detected, the wakeword engine 824 can proceed with routing the audio data 102 to an audio front end (AFE) 825 (sometimes referred to as an acoustic front end (AFE)) of the voice services component 826. If a wakeword is not detected in the audio data 102, the wakeword engine 824 can refrain from sending the audio data 102 to the AFE 825, thereby preventing the audio data 102 from being further processed. The audio data 102 can be discarded.

The AFE 825 is configured to transform the audio data 102 received from the wakeword engine 824 into data for processing by a suitable ASR component and/or NLU component. The AFE 825 may reduce noise in the audio data 102 and divide the digitized audio data 102 into frames representing a time intervals for which the AFE 825 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 825 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 102. Beamforming can be used to distinguish between the directions from which speech and noise originate. Accordingly, the microphones 162 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 825 in beamforming, may be determined based on results of the wakeword engine 824's processing of the audio data 102. For example, the wakeword engine 824 may detect the wakeword in the audio data 102 from a first microphone 162 at time, t, while detecting the wakeword in the audio data 102 from a second microphone 162 a millisecond later in time (e.g., time, (+1 millisecond), and so on and so forth, for any suitable number of audio signals corresponding to multiple microphones 162 in a microphone array.

A speech interaction manager (SIM) 828 of the voice services component 826 may receive the audio data 102 that has been processed by the AFE 825. The SIM 828 may manage received audio data 102 by processing request data and non-speech noise or sounds as events, and the SIM 828 may also manage the processing of commands that are used to respond to the user speech or non-speech noise or sounds (e.g., by controlling the action(s) of the natural language processing-enabled device 110). The SIM 828 may include one or more client applications 830 for performing various functions at the natural language processing-enabled device 110.

A hybrid request selector component 832 of the natural language processing-enabled device 110 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 120. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 120 can be sent to the HEC 838 using the HP 834, which sits in the path between the SCL 836 and the SIM 828. The HP 834 may also be configured to allow audio data 102 received from the SIM 828 to pass through to the natural language processing system 120 (via the SCL 836) while also receiving (e.g., intercepting) this audio data 102 and sending the received audio data 102 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 102 that represents user speech, and to otherwise initiate the operations of the local natural language processing component 240' when new audio data 102 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 102 (e.g., by instructing the local natural language processing component 240' to execute on a previously-determined intent in order to generate a command). Meanwhile, a "terminate" event may instruct the local natural language processing component 240' to terminate further execution based on the audio data 102, such as when the natural language processing-enabled device 110 receives command data from the natural language processing system 120 and chooses to use that remotely-generated command data.

The LRO 842 may interact with a skills execution component 844 that is configured to receive intent data output from the local natural language processing component 240' and to execute a skill based on the intent.

To illustrate how the natural language processing-enabled device 110 can operate at runtime, consider an example where a user utters an expression, such as "Computer, turn off the kitchen lights." The audio data 102 is received by the wakeword engine 824, which detects the wakeword "Computer," and forwards the audio data 102 to the SIM 828 via the AFE 825 as a result of detecting the wakeword. The SIM 828 may send the audio data 102 to the HP 834, and the HP 834 may allow the audio data 102 to pass through to the natural language processing system 120 (e.g., via the SCL 836), and the HP 834 may also input the audio data 102 to the local natural language processing component 240' by routing the audio data 102 through the HEC 838 of the hybrid request selector 832, whereby the LRO 842 notifies the local natural language processing component 240' of the incoming audio data 102. At this point, the hybrid request selector 832 may wait for response data from the natural language processing system 120 and/or the local natural language processing component 240'.

The local natural language processing component 240' is configured to receive the audio data 102 from the hybrid request selector 832 as input, to recognize speech (and/or non-speech audio events) in the audio data 102, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network 104. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 150' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 150', which then interprets the utterance based on the similarity between the utterance and pre-established language models available to the local natural language processing component 240'. In some embodiments, the local ASR component 150' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 150' is customized to the user (or multiple users) who created a user account to which the natural language processing-enabled device 110 is registered. For instance, the language models (and other data) used by the local ASR component 150' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 150') and attempts to make a semantic interpretation of the ASR text data.

Natural Language Processing System

In other situations, the natural language processing-enabled device 110 may send the audio data 102 to the natural language processing system 120 for processing. As described above, the natural language processing-enabled device 110 may capture audio using the microphone 162, and send audio data 102 (e.g., representing a spoken user request), corresponding to the captured audio, to the natural language processing system 120. The natural language processing-enabled device 110 may include a wakeword detection component that detects when input audio includes a spoken wakeword, and when the wakeword is detected, the audio data 102 is sent by the natural language processing-enabled device 110 to the natural language processing system 120.

Upon receipt by the natural language processing system 120, the audio data 102 may be sent to an orchestrator 230. The orchestrator 230 may include memory and logic that enables the orchestrator 230 to send various pieces and forms of data to various components of the system.

Similar to the operation described above with respect to the local natural language processing component 240' of the natural language processing-enabled device 110, the orchestrator 230 may send the audio data 102 to a natural language processing component 240. An ASR component 150 of the natural language processing component 240 transcribes the audio data 102 into one or more hypotheses representing speech contained in the audio data 102. The natural language processing component 240 interprets the speech in the audio data based on a similarity between the characteristics of the audio data corresponding to the speech and pre-established language models. For example, the natural language processing component 240 may compare the audio data 102 with models for sounds (e.g., subword units such as phonemes) and sequences of sounds to identify words that match the sequence of sounds in the speech represented in the audio data 102. The natural language processing component 240 may send text data generated thereby to an NLU component 260 of the natural language processing component 240. The text data output by the natural language processing component 240 may include a top scoring hypothesis of the speech represented in the audio data 102 or may include an N-best list including a group of hypotheses of the speech represented in the audio data 102, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 120) to complete the intent. For example, if the text data corresponds to "Play the new album by [Musical_Artist]", the NLU component 260 may determine the user intended to invoke a music playback intent to play the identified album.

The natural language processing system 120 may include a non-transitory computer-readable memory storage 270, storing various instructions for operation of the natural language processing system 120.

As described above, the natural language processing system 120 may include one or more skills 290. The natural language processing system 120 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 120 and the natural language processing-enabled device 110 described herein may be implemented in software, hardware, firmware, or some combination thereof.

The natural language processing system 120 may reside on natural language processing-enabled device 110, in a cloud computing environment, or some combination thereof. For example, the natural language processing-enabled device 110 may include computing equipment, some portion of which is configured with some or all of the components or functionality of natural language processing system 120 and another portion of which is configured with some or all of the components or functionality of computing device(s) used in natural language processing system 120. The natural language processing-enabled device 110 may then perform a variety of functions on its own (such as when remote communications are unavailable), and/or may communicate (when capable) with computing device(s) and/or the natural language processing system 120 to perform other functions. Alternatively, all of the functionality may reside on the natural language processing-enabled device 110 or remotely.

FIGS. 10A-10B illustrate examples of establishing media connections between devices according to embodiments of the present disclosure. In some examples, an originating device 110 may have a publicly accessible IP address and may be configured to establish a real-time transport (RTP) protocol communication session directly with a session initiation protocol (SIP) endpoint 1050. The SIP endpoint 1050 may correspond to a device 110, a component within the gateway system 1025, a gateway component configured to interface with a remote network, and/or a device associated with the remote network itself. To enable the originating device 110 to establish the RTP communication session, the gateway system 1025 may include Session Traversal of User Datagram Protocol (UDP) Through Network Address Translators (NATs) system (e.g., STUN system 1010). The STUN system 1010 may be configured to allow NAT clients (e.g., an originating device 110 behind a firewall) to setup calls to a Voice over Internet Protocol (VOIP) provider hosted outside of the local network by providing a public IP address, the type of NAT they are behind, and a port identifier associated by the NAT with a particular local port. As illustrated in FIG. 10A, the originating device 110 may perform (1012) IP discovery using the STUN system 1010 and may use this information to set up an RTP communication session 1014 (e.g., UDP communication) between the originating device 110 and the SIP endpoint 1050 to establish a call.

In some examples, the originating device 110 may not have a publicly accessible IP address. For example, in some types of NAT the originating device 110 cannot route outside of the local network. To enable the originating device 110 to establish an RTP communication session, the gateway system 1025 may include Traversal Using relays around NAT (TURN) system 1020. The TURN system 1020 may be configured to connect the originating device 110 to the SIP endpoint 1050 when the originating device 110 is behind a NAT. As illustrated in FIG. 10B, the originating device 110 may establish (1022) an RTP session with the TURN system 1020 and the TURN system 1020 may establish (1024) an RTP session with the SIP endpoint 1050. Thus, the originating device 110 may communicate with the SIP endpoint 1050 via the TURN system 1020. For example, the originating device 110 may send audio data and/or image data to the gateway system 1025 and the gateway system 1025 may send the audio data and/or the image data to the SIP endpoint 1050. Similarly, the SIP endpoint 1050 may send audio data and/or image data to the gateway system 1025 and the gateway system 1025 may send the audio data and/or the image data to the originating device 110.

In some examples, the system may establish communication sessions using a combination of the STUN system 1010 and the TURN system 1020 without departing from the disclosure. For example, a communication session may be more easily established/configured using the TURN system 1020, but may benefit from latency improvements using the STUN system 1010. Thus, the system may use the STUN system 1010 when the communication session may be routed directly between two devices and may use the TURN system 1020 for all other communication sessions. Additionally or alternatively, the system may use the STUN system 1010 and/or the TURN system 1020 selectively based on the communication session being established. For example, the system may use the STUN system 1010 when establishing a communication session between two devices (e.g., point-to-point) within a single network (e.g., corporate LAN and/or WLAN), but may use the TURN system 1020 when establishing a communication session between two devices on separate networks and/or three or more devices regardless of network(s).

When the communication session goes from only two devices to three or more devices, the system may need to transition from the STUN system 1010 to the TURN system 1020. Thus, if the system anticipates three or more devices being included in the communication session, the communication session may be performed using the TURN system 1020. Similarly, when the communication session goes from three or more devices to only two devices, the system may need to transition from the TURN system 1020 to the STUN system 1010.

While FIGS. 10A-10B illustrate an RTP communication session being established between the originating device 110 and the SIP endpoint 1050, the present disclosure is not limited thereto and the RTP communication session may be established between the originating device 110 and a gateway component or other device associated with the SIP endpoint 1050 without departing from the present disclosure. Additionally or alternatively, while FIGS. 10A-10B illustrate examples of enabling communication sessions using the SIP protocol, the disclosure is not limited thereto and the gateway system 1025 may use any protocols known to one of skill in the art.

While FIGS. 10A-10B illustrate examples of enabling communication sessions using a data connection (e.g., using Voice over Internet Protocol (VOIP), session initiation protocol (SIP), and/or the like), the disclosure is not limited thereto and the various devices described herein may enable communication sessions using any type of network without departing from the disclosure. For example, the natural language processing system 120 and/or the gateway system 1025 may enable communication sessions using a cellular connection (e.g., mobile phone network) or other external network without departing from the disclosure. Thus, the natural language processing system 120 may be configured to enable voice commands (e.g., perform ASR, NLU, etc. to identify a spoken command included in audio data), whereas the gateway system 1025 may be configured to enable communication sessions using the cellular connection. For example, the gateway system 1025 may send instructions (e.g., command data) to endpoints (e.g., caller devices, such as the device 110) instructing the endpoint to establish a communication session (e.g., dial a telephone number) in response to the voice command.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method, comprising:
    detecting a first person represented in a first video data captured by a camera of a first device;
    determining a first level of engagement of the first person with the camera at a first time;
    determining a first ratio proportional to the first level of engagement of the first person with the camera;
    determining a first weight value for the first person at a second time based at least in part by increasing an initial weight value for the first person at a first rate, wherein the first rate is determined based at least in part on the first ratio; and
    controlling the first device to track the first person within frames of image data generated by the first device based at least in part on a threshold weight value.

2. The computer-implemented method of claim 1, further comprising:
    determining a second level of engagement of the first person with the camera at a third time following the first time and the second time, wherein the second level of engagement represents increased engagement relative to the first level of engagement;
    determining a second ratio proportional to the second level of engagement of the first person with the camera; and
    determining a second weight value for the person at a fourth time following the third time based at least in part by increasing the first weight value at a second rate, wherein the second rate is determined based at least in part on the second ratio.

3. The computer-implemented method of claim 2, further comprising:

determining a first priority level for the first person at the second time based at least in part on a comparison of the first weight value to the threshold weight value; and determining, based on the first priority level, that the first person is not to be tracked by the first device.

4. The computer-implemented method of claim 3, further comprising:

determining a second priority level for the first person at the fourth time based at least in part on a comparison of the second weight value to the threshold weight value, wherein the controlling the first device to track the first person within frames of image data generated by the first device is based at least in part on the comparison of the second weight value to the threshold weight value.

5. The computer-implemented method of claim 1, further comprising:

determining the initial weight value for the first person, wherein the initial weight value is specific to an engagement property;

determining a weight-increase rate associated with the engagement property; and determining the first rate by multiplying the first ratio by the weight-increase rate.

6. The computer-implemented method of claim 1, further comprising determining the first level of engagement based at least in part on a gaze direction of the first person detected in the first video data.

7. The computer-implemented method of claim 1, further comprising determining the first level of engagement based at least in part on a determination that the first person is speaking in the first video data.

8. The computer-implemented method of claim 1, further comprising determining the first level of engagement based at least in part on a determination that the first person is facing toward the camera of the first device.

9. The computer-implemented method of claim 1, further comprising:

determining a second level of engagement of the first person with the camera at a third time following the first time and the second time, wherein the second level of engagement represents decreased engagement relative to the first level of engagement;

determining a second ratio proportional to the second level of engagement of the first person with the camera; and determining a second weight value for the person at a fourth time following the third time based at least in part by decreasing the first weight value at a second rate, wherein the second rate is determined based at least in part on the second ratio.

10. The computer-implemented method of claim 9, further comprising:

controlling the first device to stop tracking the first person at the fourth time based at least in part on the second weight value and the threshold weight value.

11. The computer-implemented method of claim 1, further comprising:

detecting a second person represented in the first video data;

determining a second level of engagement of the second person with the camera at the first time;

determining a second ratio proportional to the second level of engagement of the second person with the camera;

determining a second weight value for the second person at the second time based at least in part by increasing an initial weight value for the second person at a second rate, wherein the second rate is determined based at least in part on the second ratio; and arbitrating between tracking the first person and the second person based at least in part on the threshold weight value, the first weight value, and the second weight value.

12. A system comprising:

at least one processor;

a display;

at least one camera;

a microphone; and non-transitory computer-readable memory storing instructions that, when executed by the at least one processor, are effective to:

detect a first person represented in a first video data;

determine a first level of engagement of the first person with the at least one camera at a first time;

determine a first ratio proportional to the first level of engagement of the first person with the camera;

determine a first weight value for the first person at a second time based at least in part by increasing an initial weight value for the first person at a first rate, wherein the first rate is determined based at least in part on the first ratio; and control the at least one camera to track the first person within frames of image data generated by the first device based at least in part on a threshold weight value.

13. The system of claim 12, the non-transitory computer-readable memory storing further instructions that, when executed by the at least one processor, are further effective to:

determine a second level of engagement of the first person with the camera at a third time following the first time and the second time, wherein the second level of engagement represents increased engagement relative to the first level of engagement;

determine a second ratio proportional to the second level of engagement of the first person with the camera; and determine a second weight value for the person at a fourth time following the third time based at least in part by increasing the first weight value at a second rate, wherein the second rate is determined based at least in part on the second ratio.

14. The system of claim 13, the non-transitory computer-readable memory storing further instructions that, when executed by the at least one processor, are further effective to:

determine a first priority level for the first person at the second time based at least in part on a comparison of the first weight value to the threshold weight value; and determine, based on the first priority level, that the first person is not to be tracked by the at least one camera.

15. The system of claim 14, the non-transitory computer-readable memory storing further instructions that, when executed by the at least one processor, are further effective to:

determine a second priority level for the first person at the fourth time based at least in part on a comparison of the second weight value to the threshold weight value, wherein the controlling the at least one camera to track the first person within frames of image data generated by the at least one camera is based at least in part on the comparison of the second weight value to the threshold weight value.

16. The system of claim 12, the non-transitory computer-readable memory storing further instructions that, when executed by the at least one processor, are further effective to:
- determine the initial weight value for the first person, wherein the initial weight value is specific to an engagement property;
- determine a weight-increase rate associated with the engagement property; and
- determine the first rate by multiplying the first ratio by the weight-increase rate.

17. The system of claim 12, the non-transitory computer-readable memory storing further instructions that, when executed by the at least one processor, are further effective to determine the first level of engagement based at least in part on a gaze direction of the first person detected in the first video data.

18. A non-transitory computer-readable storage medium storing instructions that, when executed by at least one processor, are effective to perform a method comprising:
- detecting a first person represented in a first video data;
- determining a first level of engagement of the first person with a camera at a first time;
- determining a first ratio proportional to the first level of engagement of the first person with the camera;
- determining a first weight value for the first person at a second time based at least in part by increasing an initial weight value for the first person at a first rate, wherein the first rate is determined based at least in part on the first ratio; and
- controlling the camera to track the first person within frames of image data generated by the camera based at least in part on a threshold weight value.

19. The non-transitory computer-readable storage medium of claim 18, storing further instructions that, when executed by the at least one processor, are effective to perform the method further comprising:
- determining a second level of engagement of the first person with the camera at a third time following the first time and the second time, wherein the second level of engagement represents increased engagement relative to the first level of engagement;
- determining a second ratio proportional to the second level of engagement of the first person with the camera; and
- determining a second weight value for the person at a fourth time following the third time based at least in part by increasing the first weight value at a second rate, wherein the second rate is determined based at least in part on the second ratio.

20. The non-transitory computer-readable storage medium of claim 18, storing further instructions that, when executed by the at least one processor, are effective to perform the method further comprising:
- determining a first priority level for the first person at the second time based at least in part on a comparison of the first weight value to the threshold weight value; and
- determining, based on the first priority level, that the first person is not to be tracked by the camera.

\* \* \* \* \*